(12) United States Patent
Hayashida

(10) Patent No.: US 10,789,141 B2
(45) Date of Patent: Sep. 29, 2020

(54) INFORMATION PROCESSING DEVICE AND INFORMATION PROCESSING METHOD

(71) Applicant: FUJITSU LIMITED, Kawasaki-shi, Kanagawa (JP)

(72) Inventor: Akira Hayashida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 16/114,283

(22) Filed: Aug. 28, 2018

(65) Prior Publication Data

US 2019/0073285 A1   Mar. 7, 2019

(30) Foreign Application Priority Data

Sep. 1, 2017   (JP) ................. 2017-168568

(51) Int. Cl.
| | |
|---|---|
| *G06F 9/44* | (2018.01) |
| *G06F 11/22* | (2006.01) |
| *G06F 9/4401* | (2018.01) |
| *G06F 11/07* | (2006.01) |

(52) U.S. Cl.
CPC ........ *G06F 11/2284* (2013.01); *G06F 9/4411* (2013.01); *G06F 11/0757* (2013.01); *G06F 11/2221* (2013.01)

(58) Field of Classification Search
CPC ............... G06F 11/2284; G06F 9/4411; G06F 11/2221; G06F 11/0757
See application file for complete search history.

(56) References Cited

U.S. PATENT DOCUMENTS

| | | | | |
|---|---|---|---|---|
| 9,940,143 | B2* | 4/2018 | Kumar | G06F 9/4411 |
| 2007/0219748 | A1 | 9/2007 | Iwasa | |
| 2009/0187675 | A1* | 7/2009 | Kinoshita | G06F 3/0608 |
| | | | | 710/8 |
| 2011/0055631 | A1* | 3/2011 | Chin | G06F 11/2284 |
| | | | | 714/26 |
| 2012/0084551 | A1* | 4/2012 | Cheng | G06F 1/206 |
| | | | | 713/2 |
| 2012/0131276 | A1* | 5/2012 | Uratani | G06F 9/4411 |
| | | | | 711/118 |
| 2013/0290763 | A1* | 10/2013 | Katsumata | G06F 11/1658 |
| | | | | 713/330 |
| 2018/0239730 | A1* | 8/2018 | Itkin | G06F 13/385 |

FOREIGN PATENT DOCUMENTS

| | | |
|---|---|---|
| JP | 2002-259130 | 9/2002 |
| JP | 2007-249761 | 9/2007 |
| JP | 2009-205195 | 9/2009 |
| JP | 2013-041390 | 2/2013 |

* cited by examiner

*Primary Examiner* — Fahmida Rahman
(74) *Attorney, Agent, or Firm* — Fujitsu Patent Center

(57) ABSTRACT

An information processing device includes a device, a management device that is connected to the device via a first transmission route and configured to acquire information regarding the device via the first transmission route, and a processing device that is connected to the device via a second transmission route, connected to the management device via a third transmission route, and configured to initialize the device and acquire the information from the management device via the third transmission route.

13 Claims, 19 Drawing Sheets

FIG. 11

| ACTIVATION MODE | ENABLED CPU (CORE) | ENABLED DIMM (MEMORY) |
|---|---|---|
| MINIMUM ACTIVATION MODE | ONLY ONE CORE IS ENABLED IN EACH CPU | ONLY ONE DIMM IS ENABLED IN EACH CPU |
| NORMAL MODE | ALL CORES ARE ENABLED | ALL DIMMS ARE ENABLED |

FIG. 13

| SLOT | VENDOR ID DEVICE ID | ALLOCATION RESOURCE | PCI ADDRESS |
|---|---|---|---|
| 1 | XXXX | b8000000 SIZE=4M | 10:00.0 |
| 2 | YYYY | b8400000 SIZE=4M | 12:00.0 |
| 3 | YYYY | b8800000 SIZE=4M | 12:00.1 |
| 4 | XXXX | b8c00000 SIZE=4M | 20:00.0 |
| 5 | YYYY | b9000000 SIZE=4M | 22:00.0 |
| 6 | YYYY | b9400000 SIZE=4M | 22:00.1 |

FIG. 17

| SLOT | VENDOR ID | DEVICE ID | SERIAL NUMBER |
|---|---|---|---|
| 0 | XXXX | VVVV | AA001 |
| 1 | READ ERROR | READ ERROR | READ ERROR |
| 2 | XXXX | VVVV | AA002 |
| 3 | YYYY | UUUU | BB002 |
| 4 | XXXX | VVVV | AA003 |
| 5 | YYYY | UUUU | BB003 |

| SLOT | VENDOR ID | DEVICE ID | SERIAL NUMBER |
|---|---|---|---|
| 0 | XXXX | VVVV | AA001 |
| 1 | YYYY | UUUU | BB001 |
| 2 | XXXX | VVVV | AA002 |
| 3 | YYYY | UUUU | BB002 |
| 4 | XXXX | VVVV | AA003 |
| 5 | YYYY | UUUU | BB003 |

FIG. 19

| SLOT | DEVICE DISABLE SETTING |
|---|---|
| 1 | ENABLE |
| 2 | ENABLE |
| 3 | DISABLE |
| 4 | ENABLE |
| 5 | ENABLE |
| 6 | ENABLE |

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2017-168568, filed on Sep. 1, 2017, the entire contents of which are incorporated herein by reference.

FIELD

The embodiment discussed herein is related to information processing technology.

BACKGROUND

An information processing device exemplified by a computer, a server, or the like is activated in accordance with a program controlling basic inputs and outputs, which is referred to as a basic input/output system (BIOS). At the time of activation, the information processing device initializes each of units exemplified by a central processing unit (CPU), a memory, and an input/output (I/O) device. The initialization of the I/O device is implemented by a driver of the I/O device. The CPU that executes the BIOS calls the driver and waits until the initialization is completed. In the description below, in a case where the CPU performs processing using the BIOS, it may be also described that the BIOS performs processing, simply.

Furthermore, some information processing devices are mounted with a management device such as a baseboard management controller (BMC). Such a management device is operated by a dedicated CPU, a memory, and an operating system (OS), separately from the information processing device. The BIOS is communicable with the management device as described above with predetermined procedures.

For example, the BIOS collects information of the I/O device after the initialization of the I/O device. The BIOS notifies the management device of the collected information of the I/O device. The management device is able to support management of the information processing device based on the information of the I/O device provided from the BIOS.

The related arts are disclosed in Japanese Laid-open Patent Publication No. 2013-041390, Japanese Laid-open Patent Publication No. 2007-249761, and Japanese Laid-open Patent Publication No. 2002-259130, for example.

SUMMARY

According to an aspect of the invention, an information processing device includes a device, a management device that is connected to the device via a first transmission route and configured to acquire information regarding the device via the first transmission route, and a processing device that is connected to the device via a second transmission route, connected to the management device via a third transmission route, and configured to initialize the device and acquire the information from the management device via the third transmission route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating details of an activation mode;

FIG. 13 is a diagram illustrating data of I/O device information;

FIG. 17 is a diagram illustrating information of an I/O device;

FIG. 19 is a configuration example of a device disable setting management table.

DESCRIPTION OF EMBODIMENT

During activation of an information processing device, until initialization of each unit is completed, there is a period during which information of units, such as an I/O device, in the information processing device is not be able to be acquired. With a conventional technique, when a failure occurs in any part of an information processing device during initialization, the information processing device is not able to identify a part in which the failure occurs in some cases. This disables the information processing device to present information indicating the part in which a failure occurs, whereby time and labor have to be taken to recover the failure.

In the description below, an information processing device according to an embodiment will be described with reference to the drawings. The configuration in the embodiment below is an example, and the information processing device is not limited to that described in the embodiment.

Figure 1:
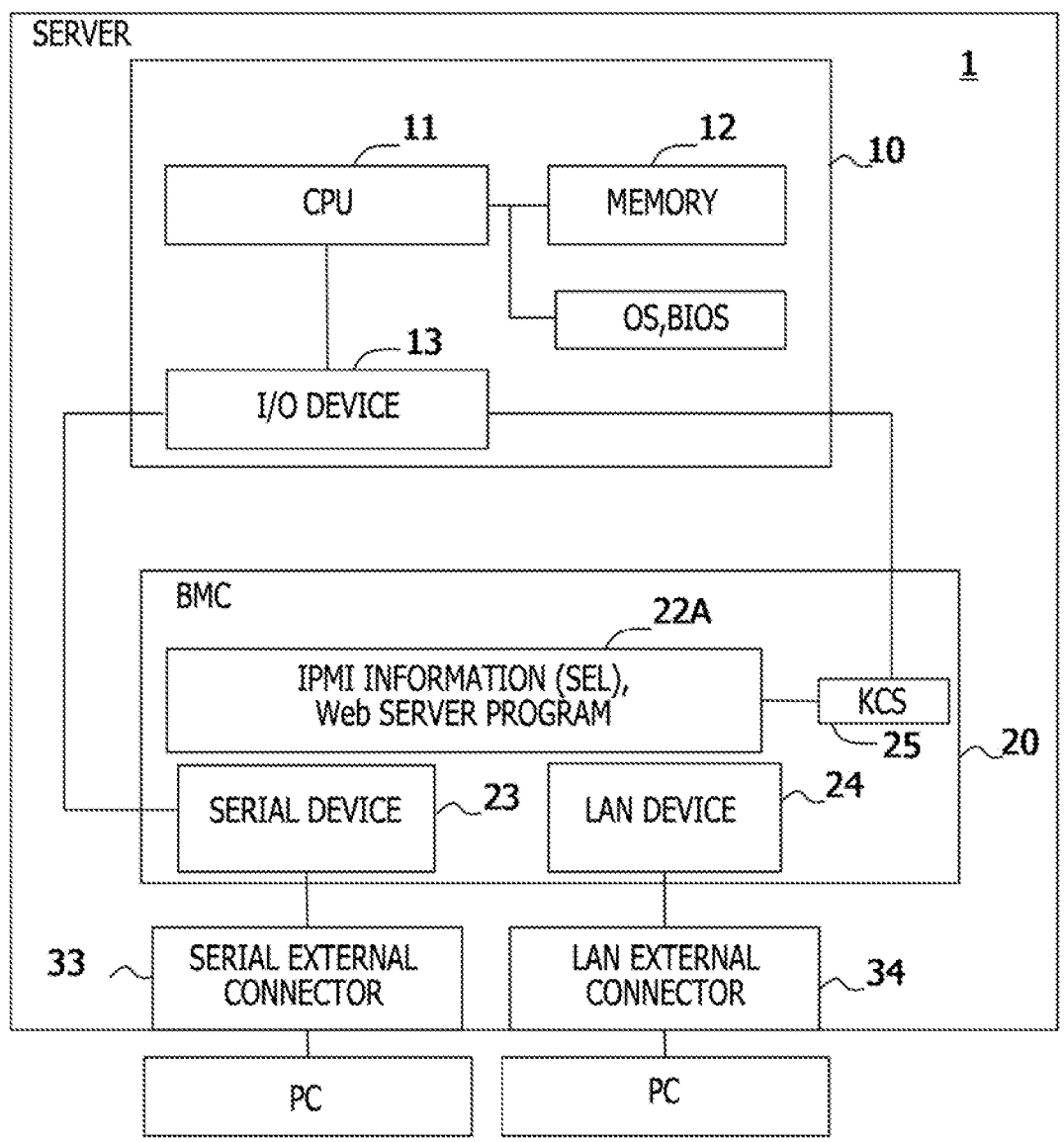
FIG. 1 is a diagram illustrating a configuration of a server according to an embodiment.

In FIG. 1, a configuration of a server 1 according to the present embodiment is illustrated as an example of the information processing device. The server 1 performs information processing using a processing device 10 including a CPU 11, a memory 12, and an I/O device 13. The server 1 retains BIOS in a read only memory (ROM) and retains an operating system (OS) in an external storage device, for example. When the server 1 is activated, the server 1 initializes each unit therein using the BIOS and boots the OS.

Figure 5:
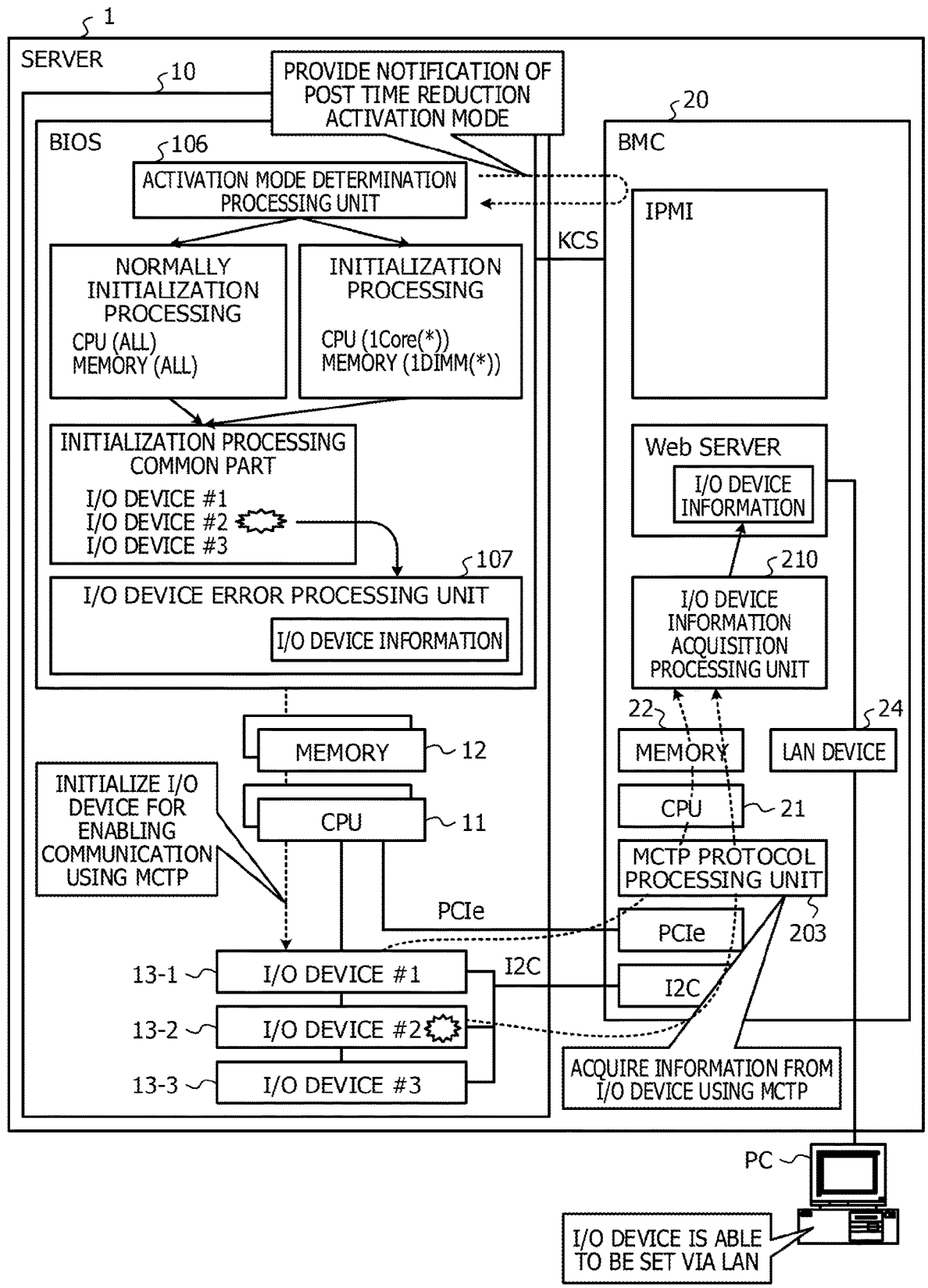
FIG. 5 is a diagram illustrating the configuration and a data flow of the server according to the embodiment.

Furthermore, the server 1 is mounted with a BMC 20. The BMC 20 performs remote power source control and hardware monitoring with respect to the server 1 based on the Intelligent Platform Management Interface (IPMI) specification. As illustrated in FIG. 5, the BMC 20 includes a CPU 21 and a memory 22 separately from the processing device 10 and is operated by an OS different from that for the processing device 10. The memory 22 of the BMC 20 stores therein information 22A such as IPMI information (for example, system event log (SEL)) and a web server program in FIG. 1. Furthermore, the BMC 20 communicates with each unit of the server 1 in accordance with an interface specification compliant with the IPMI. The IPMI is a standard interface specification for enabling to monitor the hardware of a computer such as the server 1 without depending on a certain hardware system or an OS. That is to say, the IPMI is an interface specification for performing monitoring, remote control, and the like of basic components, such as the CPU, a bus, a fan, a temperature sensor, and the voltage, of the server 1 or other unit. A management device that manages the server 1 is able to remotely monitor and manage the hardware of the server 1 through the BMC, without depending on the OS. Information obtained from the hardware is referred to as system event log (SEL).

For example, the BMC 20 has a keyboard controller style (KCS) interface 25 and communicates with the CPU 11 via the I/O device 13 of the server 1, for example, in accordance with the IPMI specification. Furthermore, the BMC 20 has a serial device 23 and a LAN device 24. The BMC 20 is connected to a personal computer (PC) prepared separately from the server 1 with a LAN cable connected to a LAN external connector 34 or a serial cable connected to a serial external connector 33. The PC is able to obtain information of the BMC 20 from a web server in the BMC 20 via the LAN cable or the serial cable. The transmission route connecting the BMC 20 and the I/O device 13 via the KCS interface 25 is an example of a third transmission route.

Furthermore, the server 1 manages each unit of the hardware inside the server 1 in accordance with the interface specification compliant with the IPMI specification. The IPMI is a specification for a standardized message-based hardware management interface. The information of the BMC 20 is able to be obtained via the BIOS and an IPMI driver. The IPMI driver is a program for the OS of the server 1 for communicating with a BMC 320. That is to say, the server 1 is communicable with the BMC 20 using a command compliant with the IPMI specification via an interface such as KCS, System Management Interface Chip (SMIC), and Block Transfer (BT), in accordance with the BIOS or the OS. The CPU 11 is an example of a processor and a first processor, and the I/O device 13 is an example of an electrical device.

Figure 2:
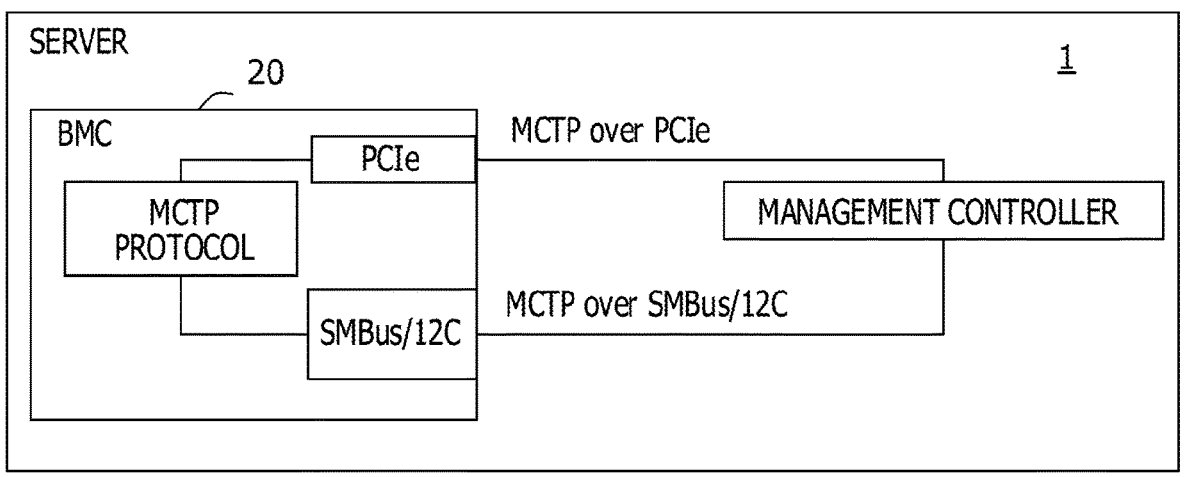
FIG. 2 is a diagram illustrating connection between a BMC and the hardware of each unit of the server.

FIG. 2 illustrates connection between the BMC 20 mounted in the server 1 and the hardware (referred to as a management controller) of each unit in the server 1. The BMC 20 acquires information of the hardware of each unit of the server 1 in accordance with Management Component Transport Protocol (MCTP). That is to say, the BMC 20 is connected with a monitoring target device (may be said to be the hardware of each unit) referred to as a management controller using a physical wire, and communicates with the monitoring target device using the physical wire. The BMC 20 communicates with the hardware of each unit (management controller) using the MCTP protocol.

The MCTP is used by a management controller such as the BMC 20 that is provided on the server 1 or an information processing device similar to the server 1. The management controller manages the state of the server 1 or statistical information using the MCTP protocol and retains management parameters. The management parameters includes a communication speed of a transmission route, a power state, a use ratio of a hardware resource, a link state of a transmission route, an error count of the hardware of each unit (such as the I/O device), and an uncorrectable error count. Accordingly, the management controller integrates the management parameters from one or a plurality of monitoring target devices using the MCTP protocol. Furthermore, the management controller enables an information processing device such as a local or remote server 1 or other management controller to access these management parameters.

Furthermore, the management controller enables to use the MCTP protocol to monitor a monitoring target device (for example, the I/O device) connected to the server 1 or the like without using an OS operated in the server 1 or the like. This reduces the load of the server 1 or the like for monitoring the monitoring target device. The management controller is able to use the MCTP protocol to access the monitoring target device (such as the I/O device) via various buses such as PCIe or I2C.

At this point, as a physical wire for the BMC 20 and the hardware of each unit, Peripheral Component Interconnect-Express (PCIe) or Inter-Integrated Circuit (I2C) may be cited as an example. However, the physical wire is not limited to the PCIe or the I2C. The physical wire may be a System Management Bus (SMBus) derived from the I2C, for example. Meanwhile, for example, the BIOS of the server 1 is able to acquire pieces of information of the hardware of each unit of the server 1 that have been collected by the BMC 20 using a command compliant with the IPMI specification. The BMC 20 is an example of the management device. That is to say, the BMC 20 is connected to the I/O device 13 as an electrical device via the I2C as a second transmission route. Furthermore, the BMC 20 is connected to the CPU 11 as the processor and the first processor via the KCS interface 25 as the third transmission route and a transmission route thereof. The MCTP is an example of a transmission protocol for communicating with an electrical device via at least one of a first interface and a second interface, without using any processor.

Comparison Example

Figure 3:
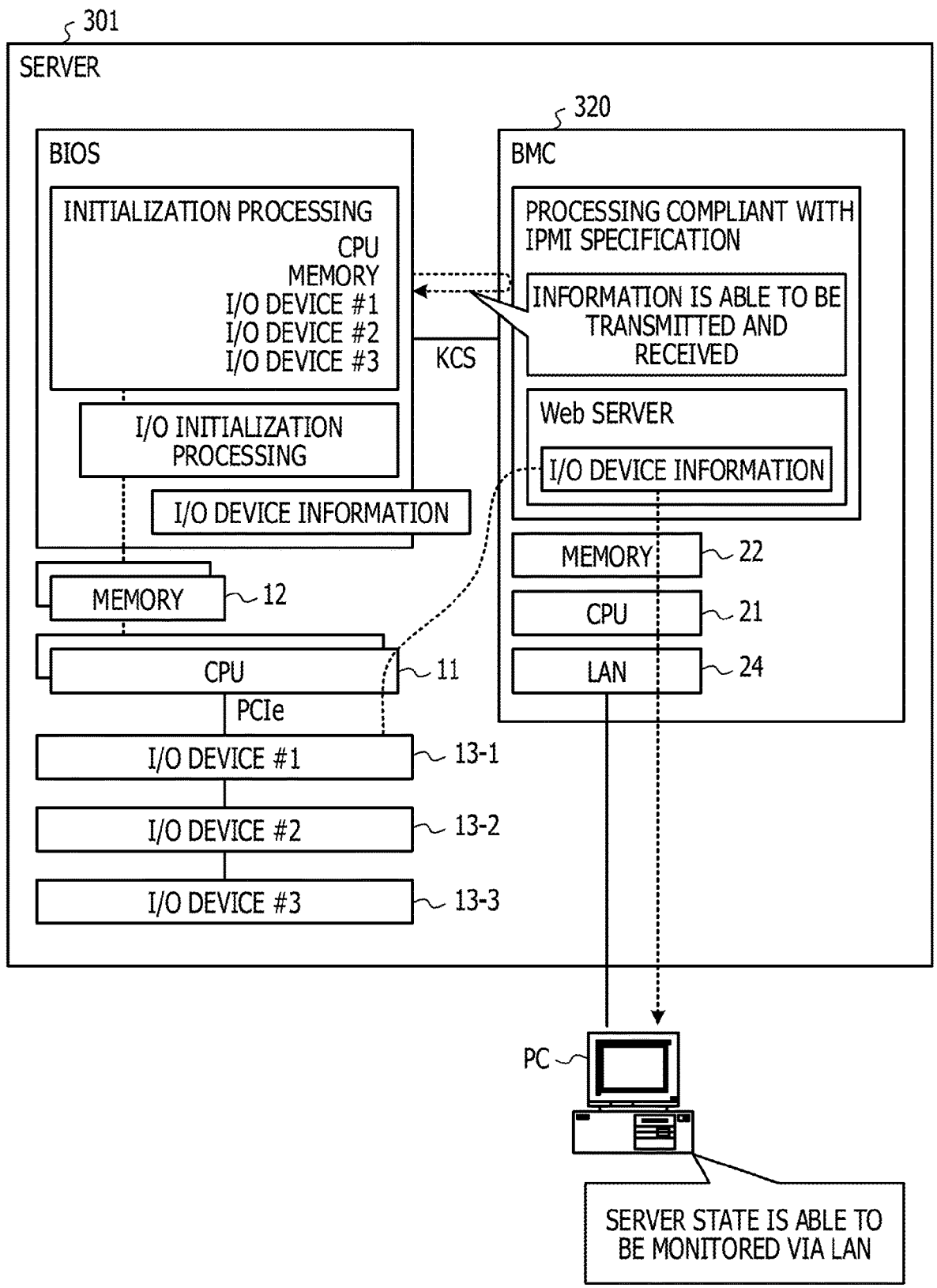
FIG. 3 is a diagram illustrating a configuration of a server according to a comparison example.

FIG. 3 illustrates a configuration of a server 301 according to a comparison example. As illustrated in FIG. 3, the server 301 according to the comparison example includes a CPU 11, a memory 12, I/O devices 13-1, 13-2, and 13-3, and the like, similarly to the server 1. In the description below, the I/O devices 13-1, 13-2, and 13-3 are referred to as an I/O device 13, collectively. Furthermore, the server 301 includes BIOS in a ROM, for example, and at the time of activation, initializes the CPU 11, the memory 12, the I/O device 13, and the like.

Furthermore, the server 301 is mounted with the BMC 320. The BMC 320 includes a CPU 21, a memory 22, and a LAN device 24 and performs processing compliant with the IPMI specification. The BMC 320 communicates with the BIOS of the server 1 using an interface in accordance with the KCS, for example. Furthermore, the BMC 320 acquires information (I/O device information) of the I/O devices 13-1, 13-2, and 13-3 and the like of the server 301 from the BIOS. Furthermore, the BMC 320 provides a function of a web server to a PC over a LAN via the LAN device 24. Accordingly, the PC is able to acquire the information from the BMC 320 and monitor the state of the server 301 via the LAN.

At the time of activation of the server 301, the I/O device 13 is initialized by a driver of the I/O device 13 in accordance with the control of the BIOS. For example, at the time of activation of the server 301, the BIOS calls the driver and waits until the initialization is completed. Furthermore, the BIOS collects information of the I/O device 13 after the initialization of the I/O device 13. At this point, the information of the I/O device 13 includes the number of the slot to which the I/O device 13 is attached, information of the vendor of the I/O device 13, information identifying the type (for example, the card type) of the I/O device 13. The information of the I/O device 13 is information that is referred to for identifying the I/O device 13 when a trouble occurs in the I/O device 13.

Furthermore, as described above, the BIOS and the BMC 320 are able to transmit and receive information with the IPMI specification. Accordingly, the BIOS notifies the BMC 320 of the collected information, and a server manager is able to check the information of an I/O device via the BMC 320, using a PC.

Figure 4:
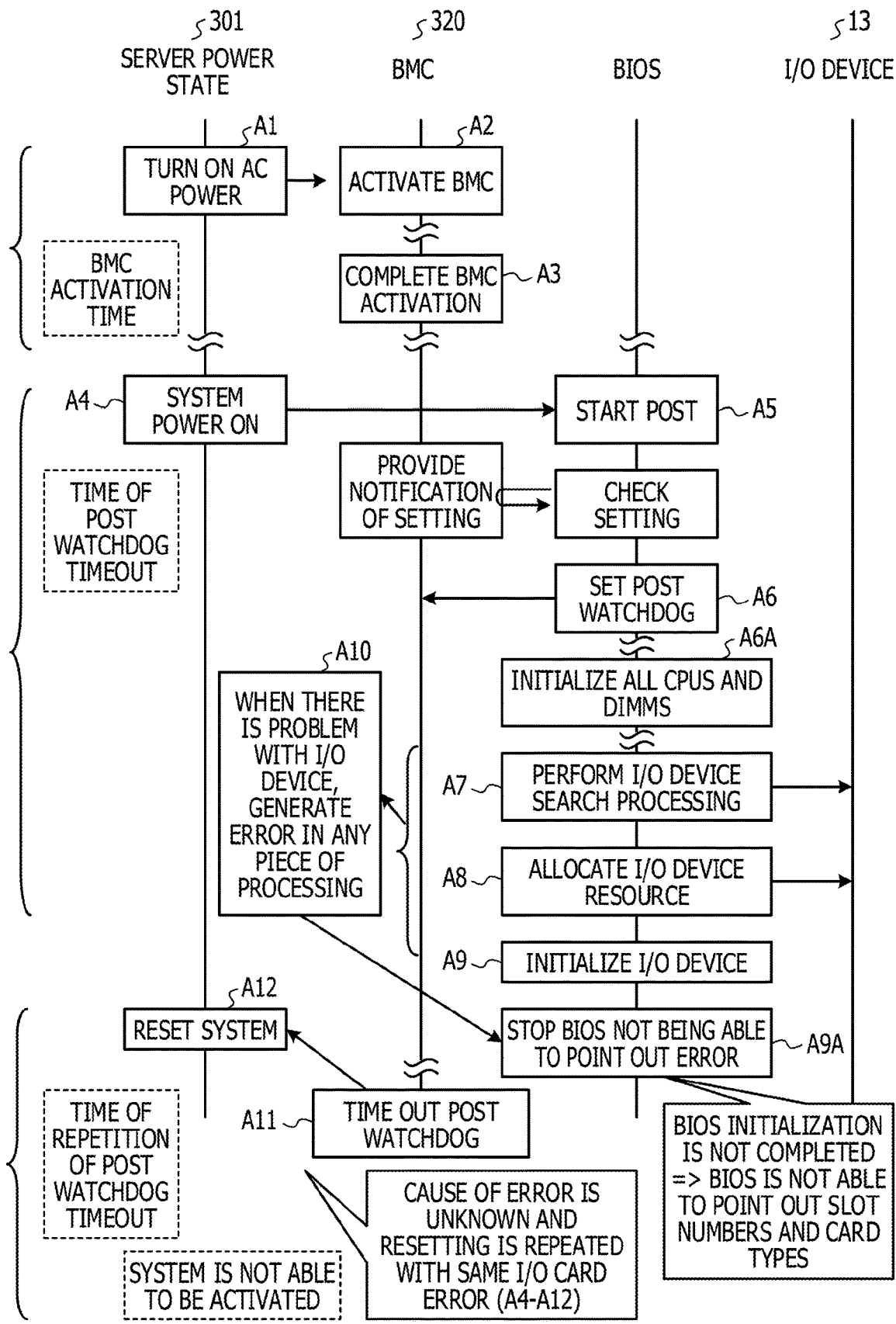
FIG. 4 is a flowchart illustrating activation processing of the server according to the comparison example.

FIG. 4 is a flowchart illustrating activation processing of the server 301 according to the comparison example. In this processing, firstly, an alternate current (AC) power is applied to the server 301 (A1). This causes the AC power of the server 301 to be turned on.

With the AC power turned on, the BMC 320 starts activation (A2). The activation process of the BMC 320 is then completed, and the BMC 320 completes the activation (A3). The time from turning on the AC power to completing the activation of the BMC 320 is a BMC activation time.

Next, the server 301 receives a user operation, for example, and turns on the power of the system of the server 301 (A4). This starts the activation process of the server 301 and the BIOS starts power-on self test (POST) (A5). The BIOS inquires of the BMC 320 about the setting at the time of activation. The setting at the time of activation includes whether the memory 12 is used in a mirror mode and whether a plurality of CPUs 11 is used as nodes so that the memory 12 is separately used for each node, for example. When the memory 12 is not separated for each node, for example, the memory 12 is accessed by the plurality of CPUs 11 evenly, as a system memory. The BIOS performs POST using the setting notified from the BMC 320.

The BIOS performs normal POST so as to provide a service to all devices. The BIOS sets a POST watchdog to the BMC 320 before the start of the POST (A6). The POST watchdog has a mechanism in which the system is reset in a case where processing is not completed within a set time.

Next, the BIOS initializes all the CPUs 11 and the memories 12 that are mounted in the server 301 (A6A). It is to be noted that the memory 12 is mounted with a dual inline memory module (DIMM), for example.

Next, the BIOS performs I/O device search processing in the POST to search the I/O device 13 (A7). Furthermore, the BIOS allocates a resource to the searched I/O device 13 (A8). The resource to be allocated to the I/O device 13 is an area in the memory 12 used by the I/O device 13, for example. It is to be noted that when the CPU 11 accesses the I/O device 13, the CPU 11 accesses an address of an address space in the memory 12. Next, the BIOS initializes all of the I/O devices 13 sequentially (A9).

A case where, in the processing from A7 to A9, a failure occurs in the I/O device 13 is assumed. When an error occurs in any stage of the processing from A7 to A9, processing performed by the BIOS is stopped (A9A). This is because, at this point, the initialization of the I/O device 13 has not been completed and the BIOS is not able to identify the information of the I/O device 13 such as the slot number, the card type, or the like. The BIOS thus is not able to perform processing for recovering from the error.

Because the processing of the BIOS is stopped, the POST watchdog times out (A11). Because the POST watchdog times out, the system is reset (A12). However, the BIOS does not retain the information identifying the I/O device 13 and the cause of the error is unknown, whereby resetting is repeated with the same error of the I/O device 13 (from A4 to A12). This disables the server 301 to be activated. For the server 301 to recover from the error, for example, the user has to perform an isolation operation by manually removing the I/O device 13, for example, I/O cards one by one to check whether normal activation is possible.

Embodiment

In an embodiment, the BMC 20 collects the information of the I/O device 13 before the start of the POST by the BIOS, whereby the problem that occurs in the above-described comparison example is solved. That is to say, even if an error occurs in a state in which the BIOS does not retain the information identifying the I/O device 13 when the BIOS performs the POST, the BIOS receives the information of the I/O device 13 provided from the BMC 20, whereby the BIOS is able to identify the cause of the error and the part in which the error has occurred.

That is to say, even when the server 1 is activated and the POST is not completed, the server 1 is able to acquire the information of the I/O device 13. In a case where the server 1 is a large-scale system, the number of the I/O devices 13 is very large. With this, even when an error has occurred in one of the I/O devices 13, the remaining ones of the I/O devices 13 are usable, enabling activation of the server 1. Furthermore, when errors occur in a plurality of I/O devices 13, the BIOS points out the plurality of errors without stopping at an error in one of the I/O devices 13, enabling to collectively perform operations for replacing the I/O device 13 that has a trouble.

<Data Flow>

FIG. 5 is a diagram illustrating the configuration and a data flow of the server 1 according to the embodiment. The server 1 according to the embodiment includes a CPU 11, a memory 12, an I/O device 13, a ROM storing BIOS, and a BMC 20, similarly to the server 301 in the comparison example. Furthermore, the BMC 20 includes a CPU 21, a memory 22, a LAN device 24, and the like, similarly to FIG. 3 for the comparison example.

However, unlike the case of the comparison example, the BMC 20 includes an I/O device information acquisition processing unit 210 that acquires information of the I/O device 13 in advance and an MCTP protocol processing unit 203 that performs communication complaint with the MCTP. The I/O device information acquisition processing unit 210 also notifies the BIOS of the acquired information of the I/O device 13 in advance. "In advance" means before the BIOS performs activation of the entire server 1.

That is to say, the BIOS uses not only the information of the I/O device 13 that the BIOS itself has acquired but also information of the I/O device 13 acquired from the BMC 20. However, to acquire the information of the I/O device 13 using the BMC 20 in advance, at least the power has to be applied to the I/O device 13 as a condition. For this reason, in the server 1, the activation processing is proceeded at least up to the stage in which the power is applied to the I/O device 13.

Furthermore, in the present embodiment, the BMC 20 acquires information from the I/O device 13 with a configuration and procedures compliant with the MCTP via a transmission route other than the PCIe being a transmission route connecting the CPU 11 and the I/O device 13, for example, a transmission route of the I2C connecting the BMC 20 and the I/O device 13, for example. However, when the I/O device 13 is initialized by the BIOS, the BMC 20 is able to acquire the information from the I/O device 13 via the PCIe being a transmission route connecting the CPU 11 and the I/O device 13.

Furthermore, a control unit that performs communication compliant with the MCTP, which is omitted in FIG. 5, is provided also in the I/O device 13. The MCTP protocol processing unit 203 within the BMC 20 communicates with the control unit provided also in the I/O device 13 via a transmission route of the PCIe or the I2C to acquire the information of the I/O device 13.

In the present embodiment, the activation processing of the server 1 is performed in a manner separated in two stages. In the first stage, the power is applied to the I/O device 13. After the power is applied to the I/O device 13, the BMC 20 acquires the information from the I/O device 13 via the I2C. It is to be noted that when the BMC 20 is able to acquire the information from the I/O device 13 via the PCIe, the BIOS initializes the I/O device 13 connected to the CPU 11 via the PCIe. However, the initialization of the I/O device 13 via the PCIe in the first stage may be omitted. That is to say, in the first stage, the BMC 20 acquires the information from the I/O device 13 via at least one of the I2C and the PCIe. Then, the BMC 20 provides the information acquired from the I/O device 13 to the BIOS.

In the second stage, the server 1 is reactivated and the BIOS performs the POST and initialization of each unit of the hardware of the server 1, for example, the I/O device 13. Even in a case where an error has occurred in a state in which the BIOS is not able to identify the information of the I/O device 13 when the BIOS performs the POST, the BIOS refers to the information identifying the I/O device 13 provided from the BMC 20. For this reason, the BIOS has an I/O device error processing unit 107 that performs error processing when an error has occurred in the I/O device 13. The I/O device error processing unit 107 identifies the cause of the error based on the information identifying the I/O device 13.

For reduction of processing time in the first stage, the BIOS has a "minimum activation mode of CPU and DIMM" (hereinafter, simply referred to as a "minimum activation mode") in which only parts of the CPU 11 and the memory 12 are enabled for activation. In this minimum activation mode, to reduce the time for initialization of the CPU 11 and the memory 12, which accounts for a relatively high percentage of the activation time, only one core of the CPU 11 with multiple cores and only one device of the memory 12 (DIMM) are initialized to be usable. Furthermore, the BMC 20 has a function to notify the BIOS of the minimum activation mode. The BIOS has an activation mode determination processing unit 106 that determines the activation mode notified from the BMC 20.

The BMC 20 uses the MCTP of both of the PCIe and I2C in the I/O device information acquisition processing unit 210, enabling isolation between a trouble with the I/O device 13 itself and an abnormality in the PCIe or I2C route. However, as described above, using the MCTP in the transmission route of the PCIe is based on an assumption that the I/O device 13 is initialized and a resource such as an area in the memory 12 is allocated to the I/O device 13.

The server 1 is an example of an information processing device, the transmission route of the PCIe is an example of a first transmission route, and the transmission route of the I2C is an example of the second transmission route. The PCIe is an example of the first interface and the I2C is an example of the second interface. Furthermore, the KCS interface 25 illustrated in FIG. 1 is an example of a third interface.

Figure 6:
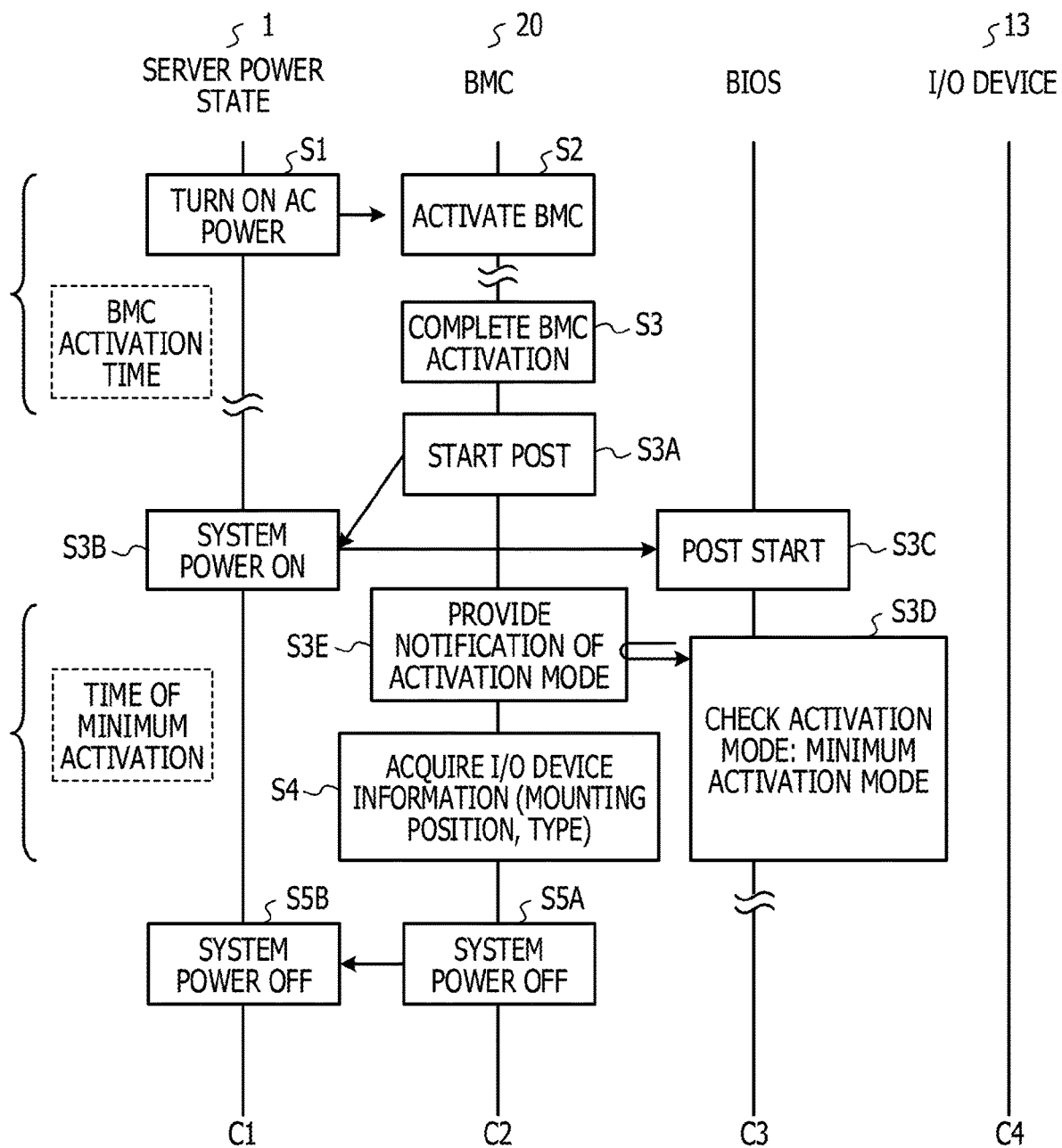
FIG. 6 is a diagram illustrating a processing flow of the server according to the embodiment.
Figure 7:
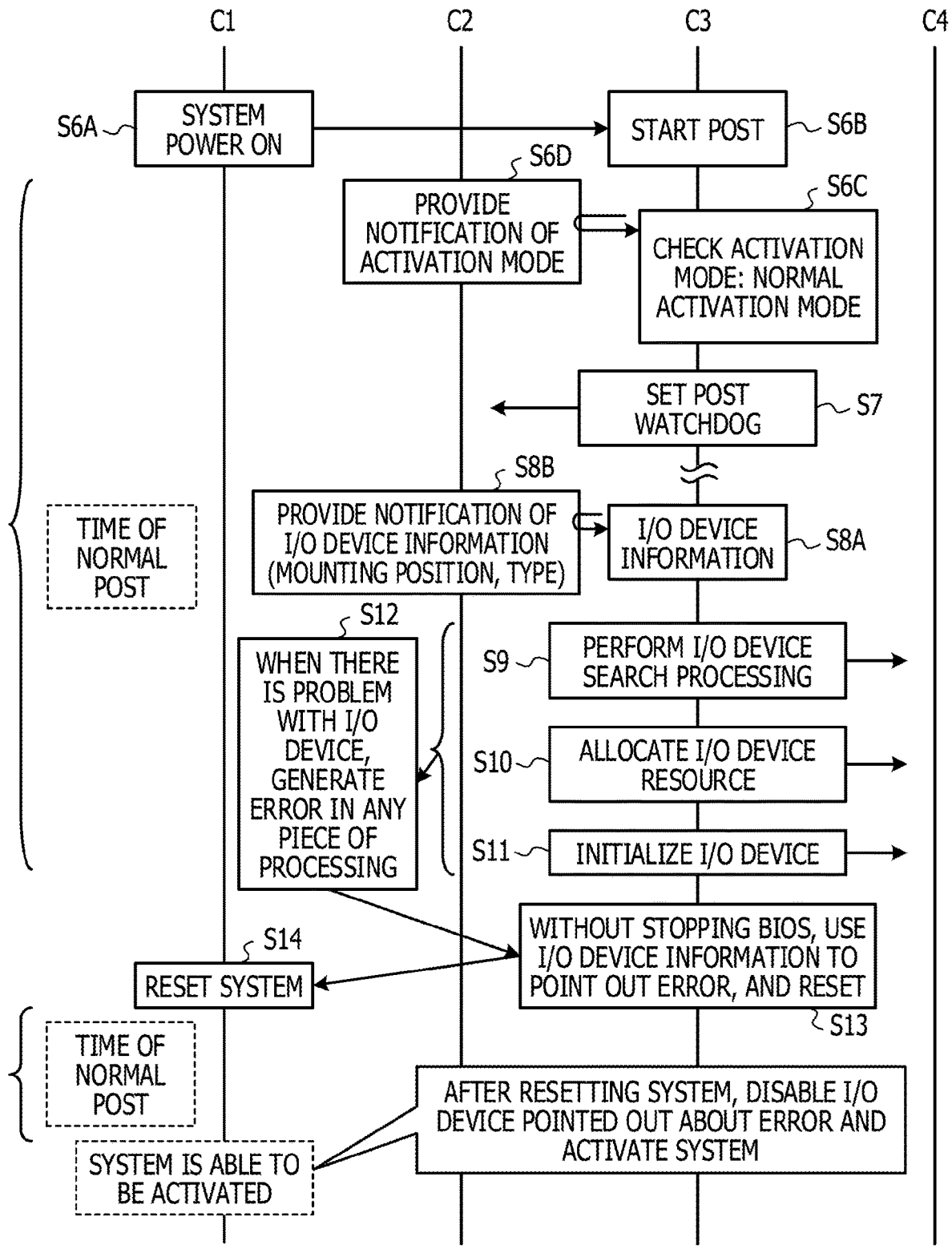
FIG. 7 is a diagram illustrating the processing flow of the server according to the embodiment.

FIGS. 6 and 7 each illustrate a processing flow of the server 1 according to the embodiment. Firstly, an AC power is applied to the server 1 (S1). This causes the AC power of the server 1 to be turned on. With the AC power turned on, the BMC 20 starts activation (S2). The activation process of the BMC 20 is then completed, and the BMC 20 completes the activation (S3).

After the BMC 20 completes the activation, the BMC 20 turns on the power of the system of the server 1. That is to say, the BMC 20 instructs the activation to the server 1 (S3A). The BMC 20 retains setting information of the activation mode of the server 1 in an activation mode storage area. During the time from turning on the AC power to acquiring the information of the I/O device 13, the BMC 20 sets the activation mode of the server 1 to the minimum activation mode and retains the minimum activation mode. The processing from S1 to S3B is an example of a management device activating a processing device. The processing at S3A and S3B is an example of the management device activating the processing device via a third transmission route.

In accordance with the instruction from the BMC 20, the activation process of the server 1 is started (S3B) and the BIOS starts the POST (S3C). The BIOS inquires of the BMC 20 about the activation mode (S3D) and the BMC 20 notifies the BIOS of the activation mode (S3E). The BIOS performs the POST in the notified activation mode (minimum activation mode). That is to say, the BIOS activates the CPU 11 and the memory 12 in the minimum activation mode, and the BMC 20 uses the MCTP through the PCIe and the I2C to acquire the information of the I/O device 13 (S4). Out of procedures at S4, a procedure using the transmission route of the I2C is an example of the management device accessing an electrical device via the I2C as the second transmission route to acquire the information identifying the I/O device 13 as an electrical device.

In communication processing compliant with the MCTP, when an error has occurred in the PCIe and no problem has occurred in the I2C, for example, the BMC 20 provides a notification of the error as an abnormality in the PCIe route. When there is a problem in both of the PCIe and the I2C, the BMC 20 provides a notification of an error of the I/O device 13. When there is an error notification, the processing at and after S5A does not have to be performed, and the BIOS outputs information that prompts replacement of the part causing the error.

Furthermore, the BMC 20 acquires the information of the I/O device 13 at S4, and the BMC 20 sets the activation mode to a "normal mode". After completing the acquisition of the information of the I/O device 13, the BMC 20 turns off the power of the server 1 (S5A, S5B).

Next, with reference to FIG. 7, the description will be continued. By a user operation, the server 1 instructs the power on of the system (S6A). When the power on of the system is instructed, the BIOS restarts the POST (S6B). The BIOS inquires of the BMC 20 about the activation mode (S6C) and performs the POST in the activation mode (normal activation mode) notified from the BMC 20 (S6D). The processing at S5A and S5B in FIG. 6 and the processing at S6A in FIG. 7 indicate an example of reactivation of a processing device. The time points at S5A and S5B in FIG. 6 are examples of the time points "after the information identifying the electrical device is acquired by the management device". The processing until the system is activated at and after S6A in FIG. 7 is an example of the information processing device being reactivated.

The BIOS sets a POST watchdog to the BMC 20 at the start of the POST (S7). Furthermore, the BIOS requests the BMC 20 for the I/O device information acquired by the BMC 20 and receives a notification of the I/O device 13 (S8A, S8B). The processing at S8A is an example of a processor acquiring the information identifying the electrical device from the management device.

The BIOS searches the I/O device 13 in the processing of searching the I/O device 13 in the POST (S9). The BIOS allocates a demanded resource to the searched I/O device 13 (S10). The BIOS initializes all of the I/O devices 13 sequentially (S11).

When a failure occurs in the I/O device 13, an error occurs in the processing at any of S9 to S11 (S12). When an error has occurred, the processing performed by the BIOS moves to an error handler. The BIOS moved to the error handler uses the I/O device information notified from the BMC 20 to point out the I/O device 13 in which the error has occurred. The BIOS uses the I/O device information notified from the BMC 20 and thereby is able to perform error processing without stopping the original processing. Accordingly, in the processing in FIG. 7, the POST watchdog does not time out. The BIOS instructs reset of the system after pointing out the error (S13). The processing at S13 is an example of the processor identifying an electrical device in which an error has occurred, based on the information which identifies the electrical device and is acquired when the error has occurred during initialization of the I/O device 13 as an electrical device.

In accordance with the instruction by the BIOS, the system is reset (S14). The BIOS disables the I/O device 13 in which an error is pointed out at the time of activation after the reset. Because the I/O device 13 having the error is not used, activation of the system is enabled by the reset. Furthermore, in a case where an error has occurred in a plurality of the I/O devices 13, as described above, the BIOS does not stop at an error and points out errors in the plurality of the I/O devices 13. The BIOS disables the plurality of the I/O devices 13 having the errors and is able to activate the system. As described above, in FIG. 7, the BIOS is able to point out errors in a plurality of the I/O devices 13. This enables to collectively perform I/O device replacement operations having troubles.

<Configurations of BIOS and BMC 20>

Figure 8:
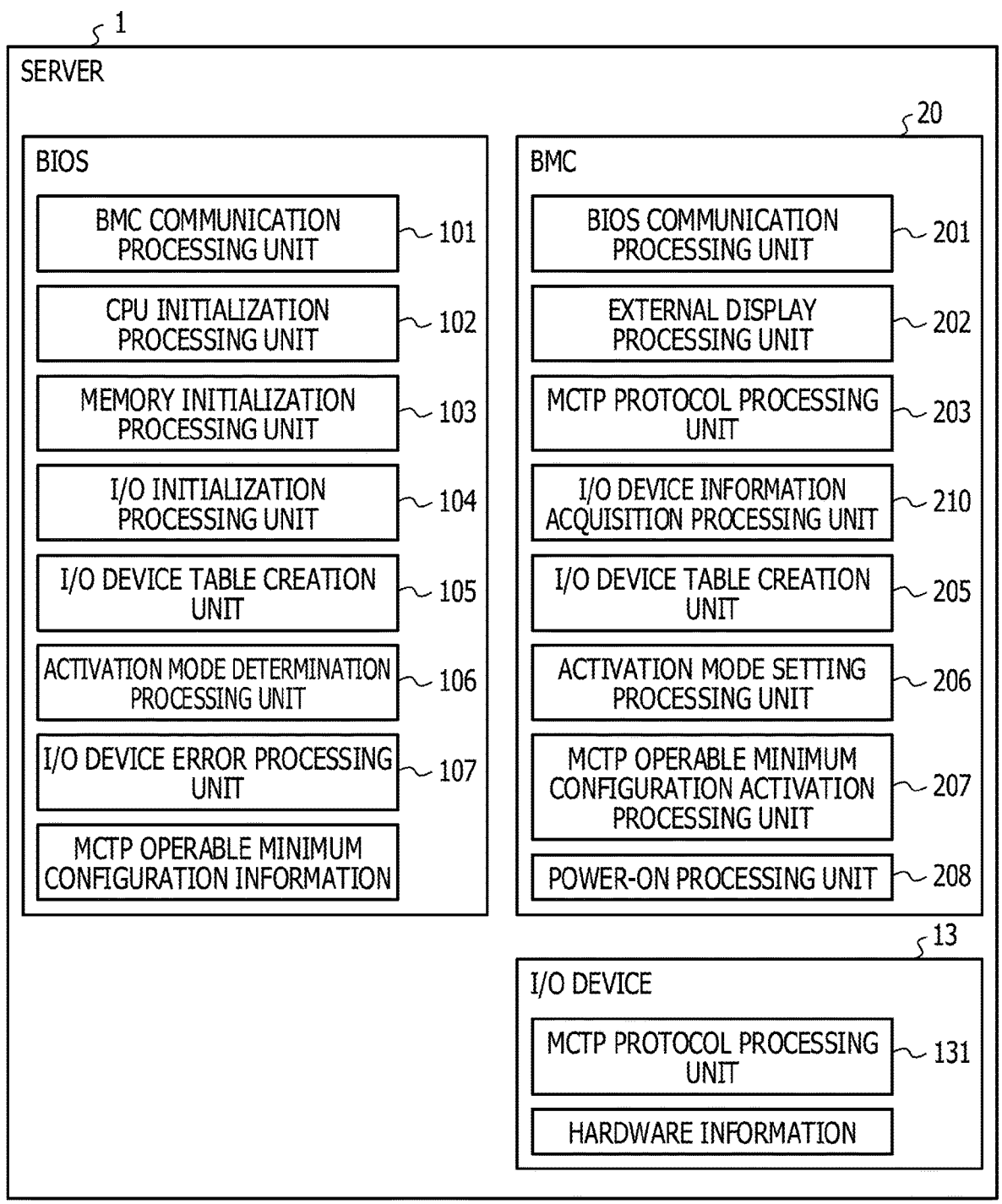
FIG. 8 is a diagram illustrating configurations of processing units performing processing of a BIOS and the BMC.

FIG. 8 is a diagram illustrating configurations of processing units performing processing of the BIOS and the BMC 20 in the server 1. In FIG. 8, the I/O device 13 also is illustrated. As described above, the BIOS is firmware stored in a ROM which is not illustrated, and the CPU 11 described with reference to FIG. 5 performs a program included in the BIOS as processing units illustrated in FIG. 8. In the description below, when the CPU 11 performs processing using the BIOS, it is also described that the BIOS performs the processing. Furthermore, it is also described that each processing unit in the BIOS which is illustrated in FIG. 8 performs the processing.

As illustrated in FIG. 8, the BIOS includes a BMC communication processing unit 101, a CPU initialization processing unit 102, a memory initialization processing unit 103, an I/O initialization processing unit 104, the I/O device table creation unit 105, an activation mode determination processing unit 106, and an I/O device error processing unit 107.

The BMC communication processing unit 101 communicates with a BIOS communication processing unit 201 of the BMC 20 using the KCS interface 25 (see FIG. 1) compliant with the IPMI standard. The CPU initialization processing unit 102 initializes the CPU 11 in the POST after the activation of the server 1. The memory initialization processing unit 103 initializes the memory 22 in the POST after the activation of the server 1. The I/O initialization processing unit 104 initializes the I/O device 13 in the POST after the activation of the server 1. The initialization of the I/O device 13 includes allocation of a resource such as the memory 12 used by the I/O device 13.

The I/O device table creation unit 105 searches the I/O device 13 in the POST after the activation of the server 1 and records the information of the I/O device 13 in an I/O device table. The activation mode determination processing unit 106 determines the activation mode specified by the BMC 20 in the POST after the activation of the server 1. The activation mode includes a minimum activation mode using a minimum configuration with which the MCTP is able to be operated and a normal activation mode. The I/O device error processing unit 107 is activated by the error handler when an error has occurred in the I/O device 13 and identifies the I/O device 13 in which the error has occurred.

Figure 9:
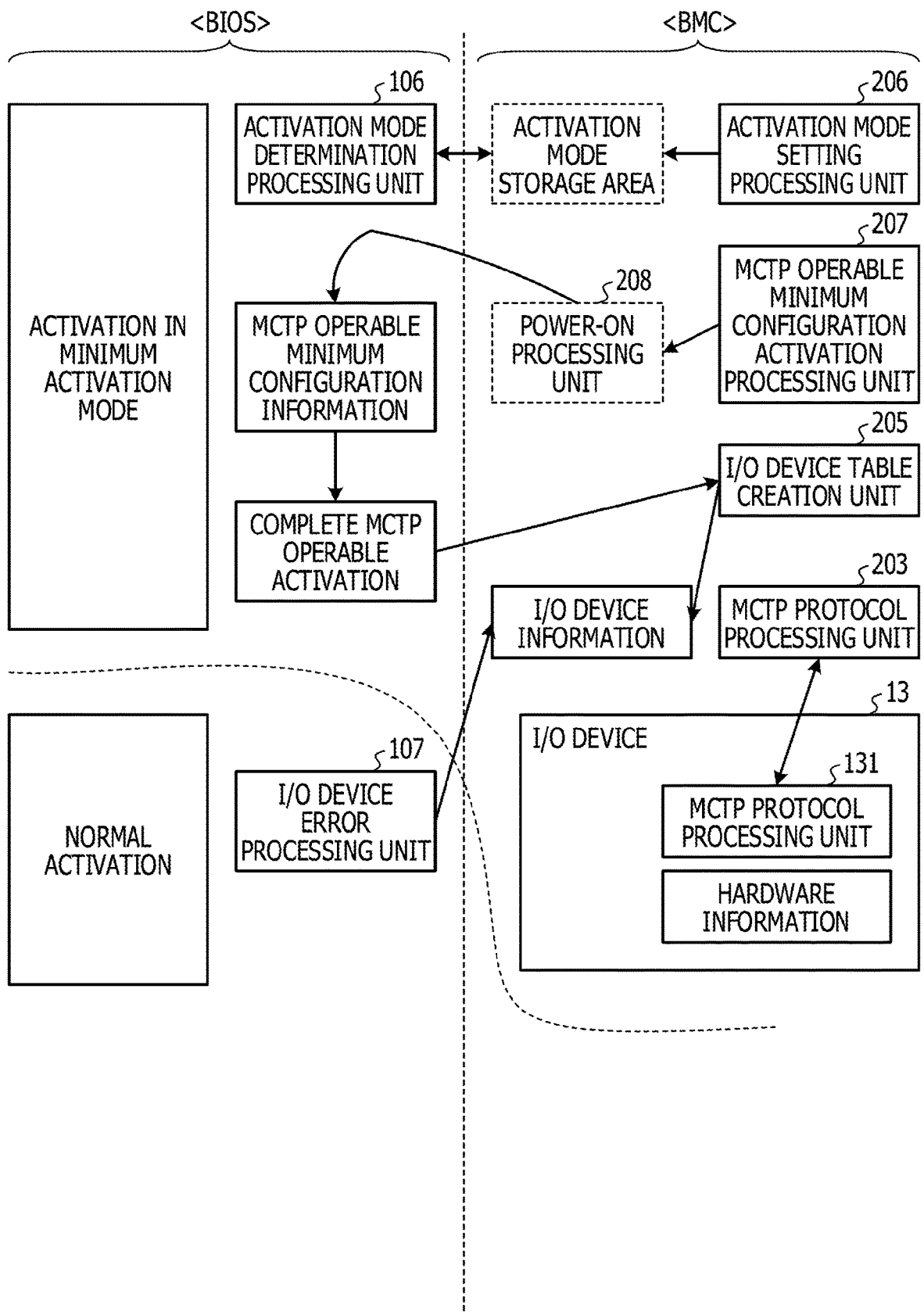
FIG. 9 is a diagram illustrating processing and a data flow of the BIOS and the BMC according to the embodiment.

Furthermore, the BMC 20 includes the CPU 21 and the memory 22, as illustrated in FIG. 5. The CPU 21 of the BMC 20 executes a program loaded to be able to be executed in the memory 22 as each processing unit illustrated in FIG. 8. In the description below, when the CPU 21 of the BMC 20 performs processing using the program in the memory 22, it is also described that the BMC 20 performs the processing. Furthermore, it is also described that each processing unit in the BMC 20 which is illustrated in FIG. 9 performs the processing.

As illustrated in FIG. 8, the BMC 20 includes the BIOS communication processing unit 201, an external display processing unit 202, the MCTP protocol processing unit 203, the I/O device information acquisition processing unit 210, an I/O device table creation unit 205, an activation mode setting processing unit 206, an MCTP operable minimum configuration activation processing unit 207, and a power-on processing unit 208.

The BIOS communication processing unit 201 communicates with the BMC communication processing unit 101 of the BIOS using the KCS interface 25 compliant with the IPMI standard. The external display processing unit 202 executes a web server program, distributes information to an external PC or the like, and receives a setting and an instruction from an external PC or the like, for example. The MCTP protocol processing unit 203 accesses the I/O device 13 in accordance with the MCTP protocol via the transmission route of the PCIe, the I2C, or the like to collect the information of the I/O device 13. The I/O device information acquisition processing unit 210 acquires the information of the I/O device 13 via the MCTP protocol processing unit 203. The I/O device table creation unit 205 stores the information identifying the I/O device 13 acquired by the MCTP protocol processing unit 203 and the I/O device information acquisition processing unit 210 in the memory 22 in the format of the I/O device table.

The activation mode setting processing unit 206 sets the activation mode of the server 1 to a predetermined address in the memory 22. The set activation mode is forwarded to the BIOS by communication between the BIOS communication processing unit 201 and the BMC communication processing unit 101. The power-on processing unit 208 applies the power to the server 1 to activate the BIOS. The MCTP operable minimum configuration activation processing unit 207 sets the minimum activation mode using the activation mode setting processing unit 206 and activates the server 1 using the power-on processing unit 208.

The I/O device 13 includes an MCTP protocol processing unit 131. The I/O device 13 also includes a CPU, a memory, and the like. The CPU of the I/O device 13 executes a program such as firmware loaded to be able to be executed in the memory, as the MCTP protocol processing unit 131. The MCTP protocol processing unit 131 acquires information of the hardware of the I/O device 13, for example, the slot number of the PCIe bus, information of the vendor, the type of the I/O device 13, the address of a resource of the memory 12 allocated to the I/O device 13, and the like and provides the acquired information to the BMC 20.

<Processing and Data Flows of BIOS and BMC 20>

FIG. 9 is a diagram illustrating processing and a data flow of the BIOS and the BMC 20 included in the server 1 according to the present embodiment. In FIG. 9, the processing of the server 1 includes two types of processing, which are processing by activation in the minimum activation mode enabling an operation using the MCTP and processing by activation in the normal mode. In the processing by activation in the minimum activation mode, firstly, the activation mode setting processing unit 206 of the BMC 20 is operated. The activation mode setting processing unit 206 stores the activation mode in the activation mode storage area of the memory 22.

Next, under the control of the MCTP operable minimum configuration activation processing unit 207, the power on is performed. The power on is performed by the power-on processing unit 208 and the activation processing of the BIOS is started. The BIOS acquires the activation mode stored in the activation mode storage area using the activation mode determination processing unit 106 and completes the activation in the minimum activation mode enabling the operation of the MCTP using MCTP operable minimum configuration information. After the completion of the activation, the BMC 20 acquires hardware information of the I/O device 13 via the MCTP protocol processing unit 203 using the I/O device table creation unit 205 and retains the information identifying the I/O device 13 in the format of the I/O device table. At the time of normal activation, the BIOS performs the normal POST. When the BIOS has detected an error in the I/O device 13 via the error handler using the I/O device error processing unit 107 during this POST, the BIOS refers to the information identifying the I/O device 13 to handle the error. For example, the BIOS identifies the I/O device 13 in which the error has occurred and provides a notification of the error together with the information of the identified I/O device 13.

<Details of Processing of BMC 20>

Figure 10:
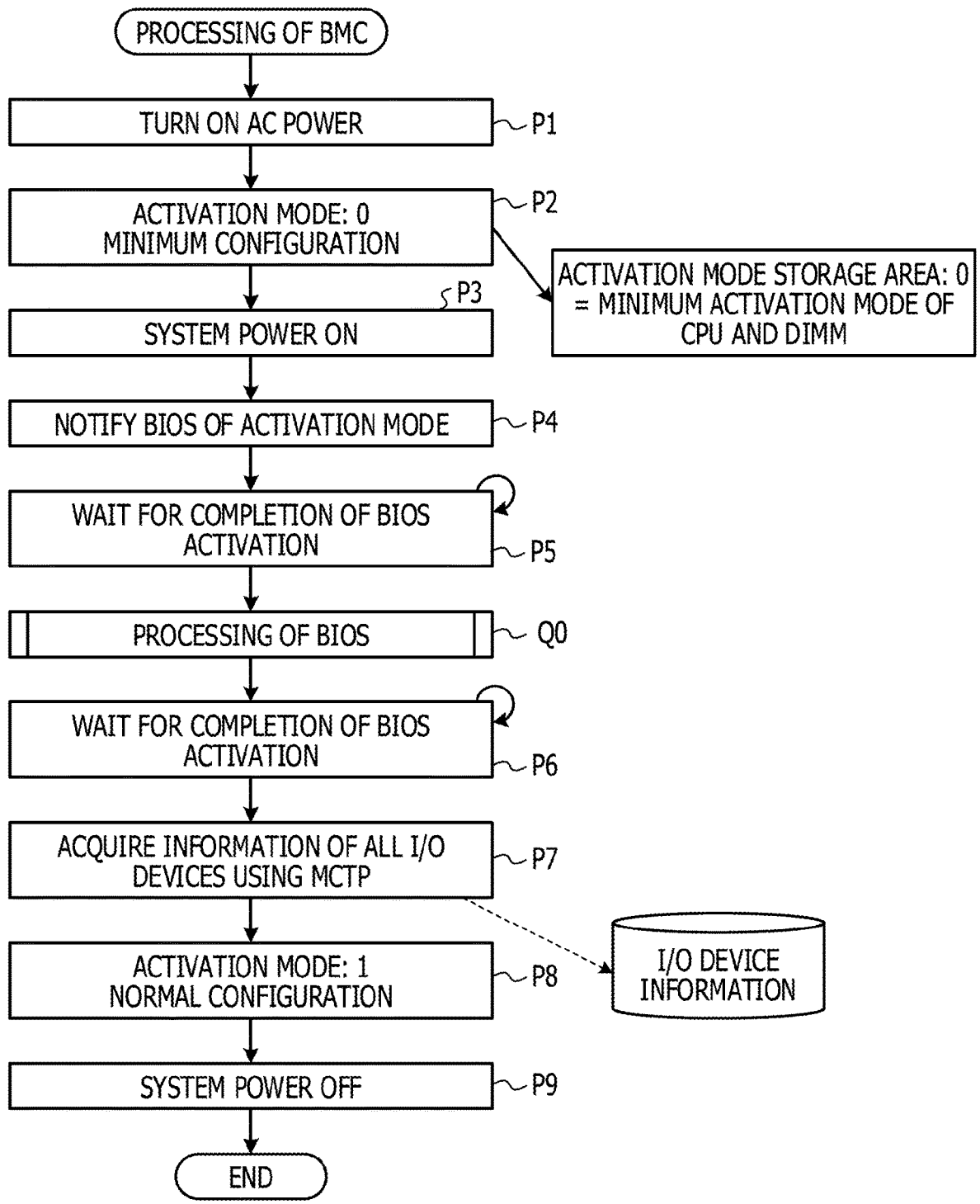
FIG. 10 is a flowchart explaining details of the processing of the BMC.

FIG. 10 is a flowchart explaining details of the processing of the BMC 20. In FIG. 10, after the AC power is applied to the server 1 (P1), the BMC 20 is activated. During the activation, the BMC 20 changes the activation mode to the "minimum activation mode" of the CPU 11 and the memory 12 (DIMM) in the activation mode setting processing unit 206 (P2).

FIG. 11 illustrates details of the activation mode. In the present embodiment, as the activation mode, the "minimum activation mode" and the "normal mode" are prepared. In the minimum activation mode, the number of enabled CPU cores of each CPU 11 is set to one and the number of enabled DIMMs of the memory 12 is set to one for the server 1 to be activated. By contrast, in the normal mode, all cores of each CPU 11 and all DIMMs of the memory 12 are set to be enabled for the server 1 to be activated.

Back to FIG. 10, the description will be continued. When the activation mode is the "minimum activation mode", the MCTP operable minimum configuration activation processing unit 207 is operated. It is to be noted that when the activation mode has been changed from the "minimum activation mode" to the normal mode and the server 1 has been reactivated, the normal mode is maintained until the number of the I/O devices 13 is increased or decreased. That is to say, when the number of I/O devices 13 is increased or decreased in the normal mode, the server 1 is reactivated in the "minimum activation mode" again.

The MCTP operable minimum configuration activation processing unit 207 performs the power-on processing of the system of the server 1 using the power-on processing unit 208 (P3) and the CPU 11 of the server 1 activates the BIOS. The processing at P2 and P3 is an example of a management device instructing activation of a processing device with a configuration of resources less than in the normal activation.

After the activation of the BIOS, the BMC 20 causes the activation mode determination processing unit 106 of the BIOS to read the activation mode stored in the activation mode storage area. More specifically, by a request from the BMC communication processing unit 101 of the BIOS, the BIOS communication processing unit 201 of the BMC 20 notifies the BMC communication processing unit 101 of the activation mode stored in the activation mode storage area (P4). Thereafter, the BMC 20 waits until the processing of the BIOS (Q0) is completed (P5 to P6).

When the processing of the BIOS has been completed, in the BMC 20, the I/O device table creation unit 205 acquires the information of the I/O device 13 from the MCTP protocol processing unit 131 of each I/O device 13 via the MCTP protocol processing unit 203 (P7). The BMC 20 then sets the "normal mode" (value 1) to the activation mode storage area using the activation mode setting processing unit 206 (P8). Thereafter, the BMC 20 performs the power off of the system and shuts down the server 1 once (P9).

Figure 12:
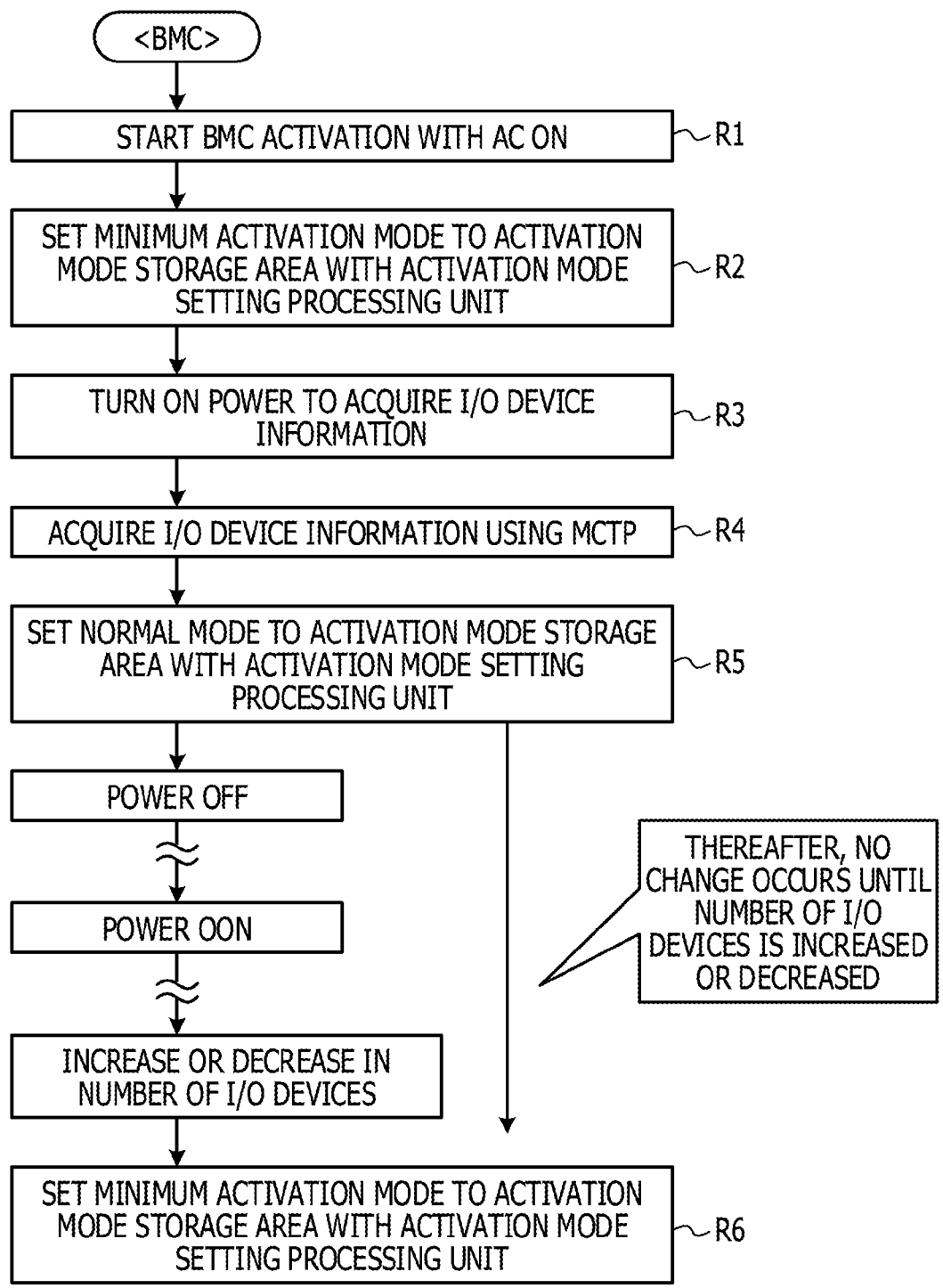
FIG. 12 is a diagram illustrating the processing of the BMC when the number of I/O devices is increased or decreased.

FIG. 12 illustrates the processing of the BMC 20 when the number of the I/O devices 13 is increased or decreased. As described with reference to FIG. 10, the BMC 20 is activated with the AC power turned on (R1). Thereafter, the activation mode setting processing unit 206 sets the minimum activation mode to the activation mode storage area (R2). To acquire the information of the I/O device 13, the BMC 20 then performs the power-on processing of the system of the server 1 (R3), and in accordance with the MCTP, acquires information from the I/O device 13 (R4). Then, the activation mode setting processing unit 206 sets the normal mode to the activation mode storage area (R5), turns off the power of the system of the server 1, and performs the power-on processing of the system of the server 1. Thereafter, the normal mode is maintained for the activation mode until the number of the I/O devices 13 is increased or decreased. On the other hand, when the number of the I/O devices 13 is increased or decreased, the activation mode setting processing unit 206 sets the minimum activation mode to the activation mode storage area (R6) and performs the power off and the power on of the system.

FIG. 13 illustrates data of the I/O device information. The I/O device information is information associating the slot number identifying a slot, a vender ID, a device ID, the address and the size of the memory 12 being an allocation resource, and the PCI address of a PCIe device among each other, for example.

The vendor ID is information uniquely identifying the vendor of the I/O device 13. The device ID is information uniquely identifying the device. The allocation resource is the initial address and the size (capacity of the area) of the memory 12 that is allocated to the I/O device 13 attached to the corresponding slot, for example. The PCI address is the address within the PCI configuration space allocated to the I/O device 13. The PCI configuration space is provided within the I/O device 13, for example, and the CPU 11 is able to access the PCI configuration space with a predetermined instruction to the I/O device 13. However, the PCI configuration space may be mapped to the address space of the memory 12 so as to be accessed from the CPU 11 using the address space of the memory 12. The CPU 11 and the I/O device 13 give and receive data via the PCI address. Furthermore, a register used by the I/O device 13 is allocated to the PCI address.

<Details of Processing of BIOS>

Figure 14:
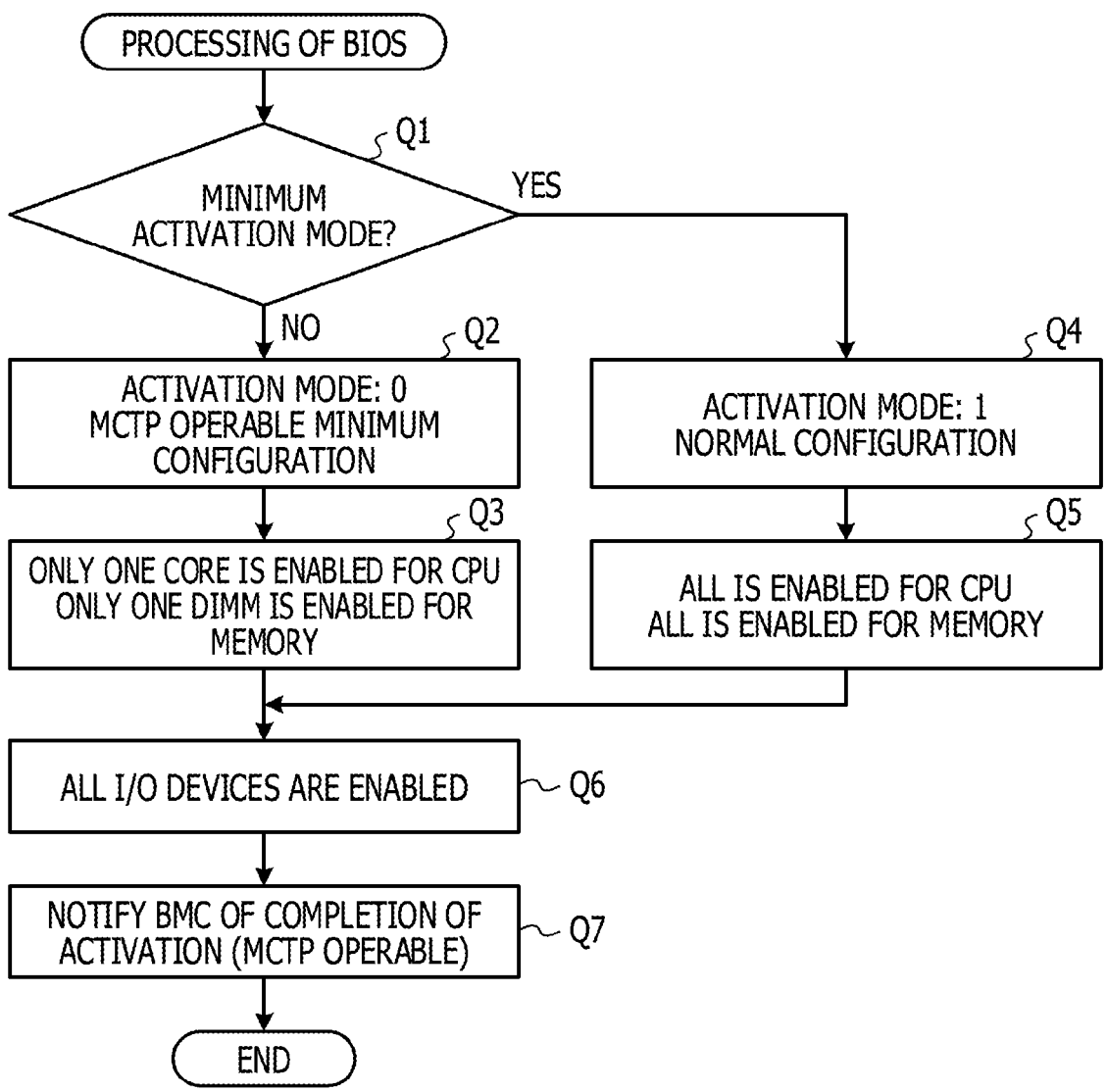
FIG. 14 is a flowchart explaining details of the processing of the BIOS.

FIG. 14 is a flowchart explaining details of the processing of the BIOS (Q0 in FIG. 10). The BIOS includes the BMC communication processing unit 101 and is able to perform communication with the BIOS communication processing unit 201 of the BMC 20 and acquire information from the BMC 20. The BIOS acquires the activation mode from the BMC 20 in the activation mode determination processing unit 106 and determines whether the activation mode is the minimum activation mode (Q1). When the activation mode is the minimum activation mode (activation mode: 0), the BIOS activates the server 1 with the minimum configuration enabling the MCTP operation. The BIOS then uses the CPU initialization processing unit 102, the memory initialization processing unit 103, and the I/O initialization processing unit 104 to perform the initialization processing of each device at the time of activation of the server 1 (Q2, Q3).

Figure 15:
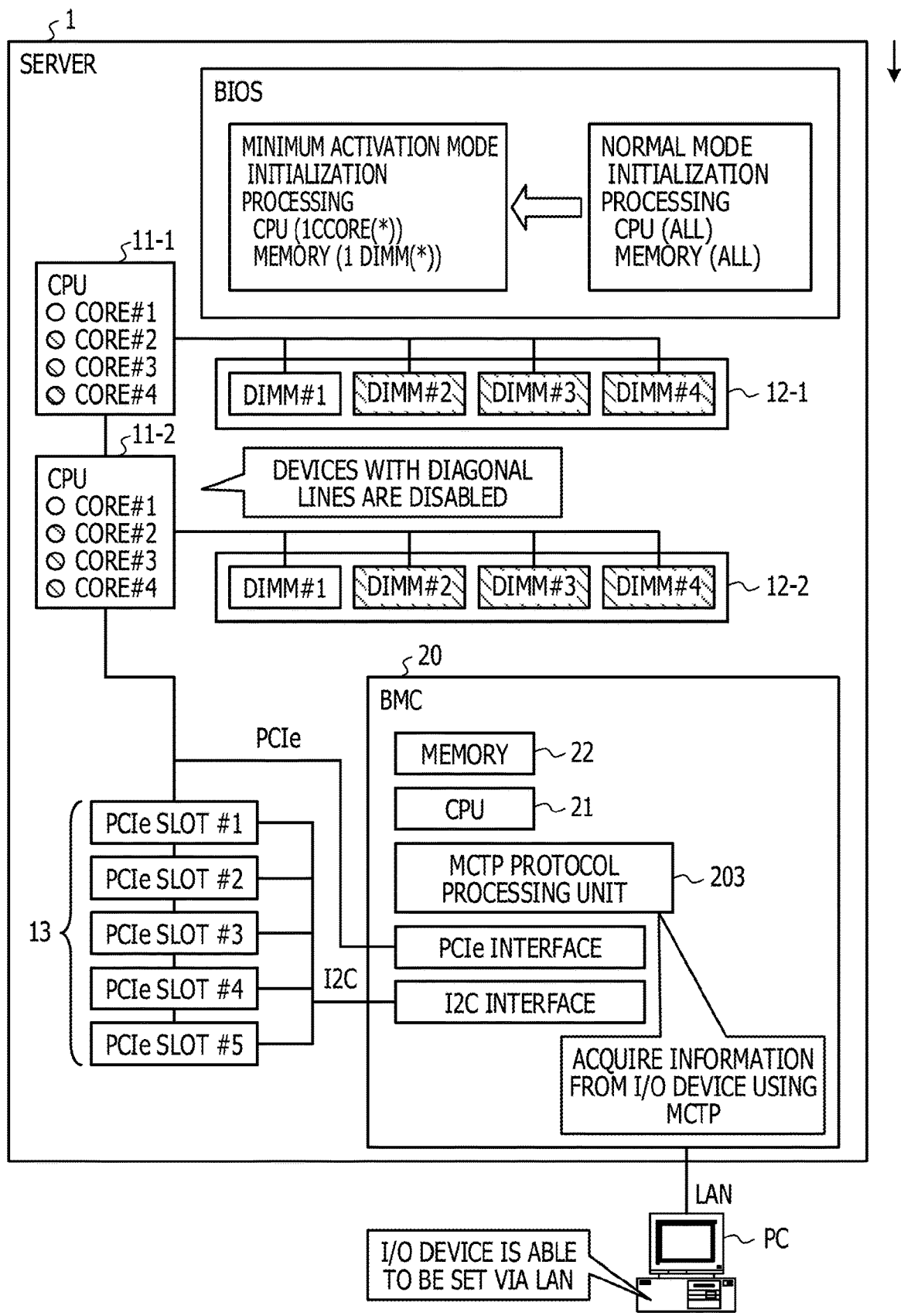
FIG. 15 is a diagram illustrating a configuration of the server activated with a minimum configuration.

FIG. 15 illustrates a configuration of the server 1 activated with the minimum configuration. In the minimum activation mode, the BIOS enables only one core of each CPU 11 and one DIMM in the memory 12 connected to that CPU 11 and initializes the enabled ones based on the MCTP operable minimum configuration information, as illustrated in FIG. 15. In the server 1 in FIG. 15, two CPUs 11-1 and 11-2 and two memories 12-1 and 12-2 are illustrated. However, in the present embodiment, the number of the CPUs 11 is not limited to two. It is to be noted that when referring to the CPUs 11-1 and 11-2 collectively, they are referred to as a CPU 11, simply.

Furthermore, in the present embodiment, the number of the memories 12 is not limited to two. The memory 12-1 is a memory 12 directly accessed by the CPU 11-1 and the memory 12-2 is a memory 12 directly accessed by the CPU 11-2. Each of the memories 12-1 and 12-2 includes DIMMs #1 to #4.

Furthermore, in FIG. 15, the server 1 includes PCIe slots #1 to #6 to which six pieces of the I/O device 13 are attached. However, in the present embodiment, the number of the I/O devices 13 is not limited to six. Furthermore, the I/O device 13 is not limited to a PCIe device.

Furthermore, in the server 1 in FIG. 15, the BMC 20 is able to access the I/O device 13 by the processing of the MCTP protocol processing unit 203 via each of a PCIe interface and an I2C interface.

In the minimum activation mode in FIG. 15, the BIOS disables the CPU cores and DIMMs with diagonal lines to activate the server 1. Accordingly, in each of the CPUs 11-1 and 11-2, a core #1 is activated, and in each of the memories 12-1 and 12-2, the DIMM #1 is initialized. With the minimum activation mode, the BIOS is able to shorten the activation time of the server 1.

Back to FIG. 14, the description will be continued. When it is determined that the activation mode is not the minimum activation mode at Q1, the BIOS activates the server 1 in the normal mode (Q4). In the normal mode, the BIOS activates all of cores #1 to #4 of each of the CPUs 11-1 and 11-2 illustrated in FIG. 15. In the normal mode, the BIOS initializes all of the DIMMs #1 to #4 in each of the memories 12-1 and 12-2 illustrated in FIG. 15 (Q5). As described above, the BIOS activates the server 1 in the minimum activation mode or the normal mode (Q6).

When the initialization has been completed, the BIOS notifies the BMC of the completion (Q7). As described with reference to P7 in FIG. 10, the BMC 20 then receives an activation completion notification of the BIOS and in the I/O device table creation unit 205, acquires the hardware information of the I/O device 13. As described above, the hardware information of the I/O device 13 is able to be acquired via the MCTP protocol processing unit 203 of the BMC 20 and the MCTP protocol processing unit 131 of the I/O device 13.

<Creation of the I/O Device Table>

Figure 16:
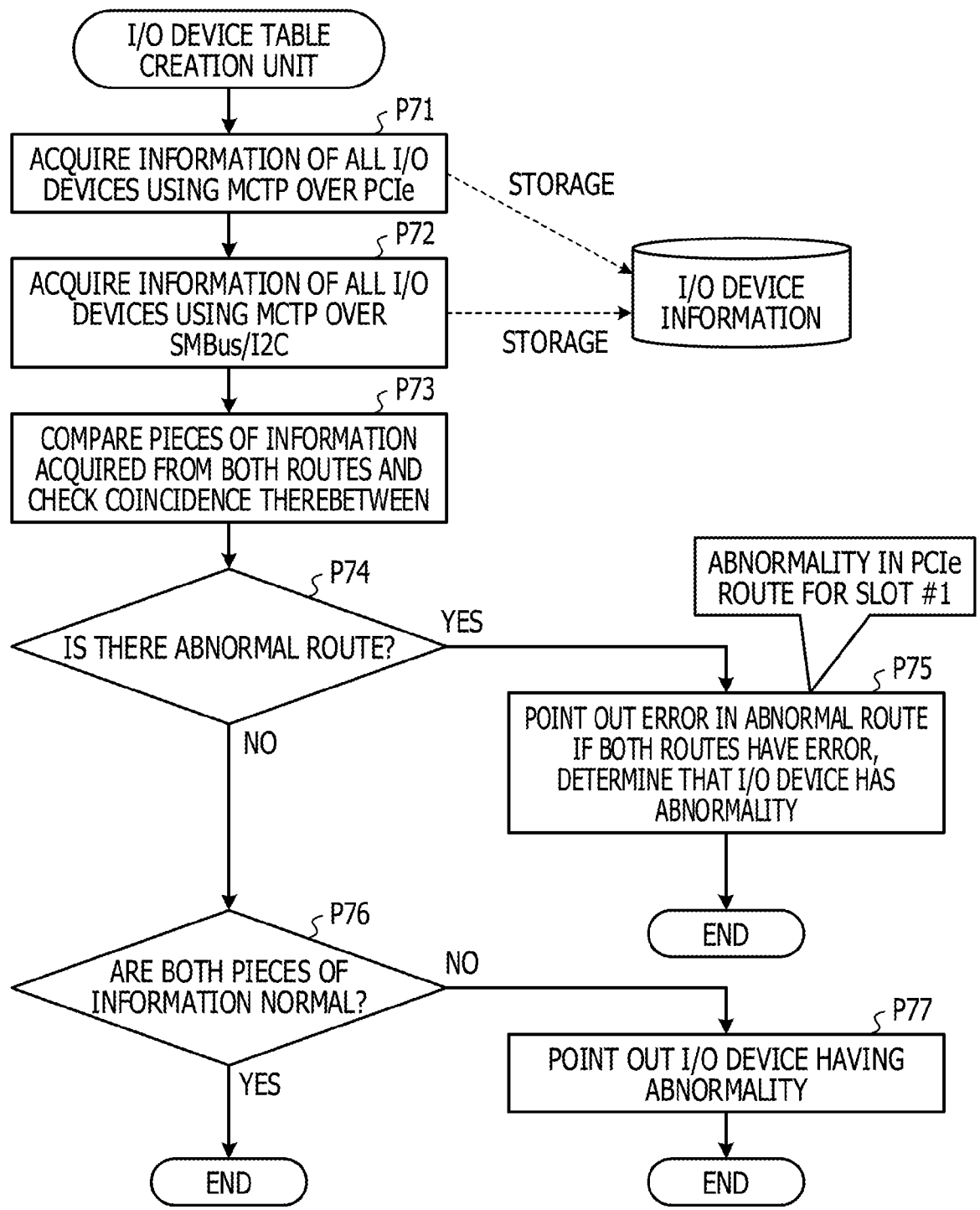
FIG. 16 is a diagram illustrating details of processing of an I/O device table creation unit.

In FIG. 16, details of the processing of the I/O device table creation unit 205 of the BMC 20 (S4 in FIG. 6, P7 in FIG. 10) are illustrated. The processing in FIG. 16 may be said to be details of the processing at S4 in FIG. 6 and details of the processing at P7 in FIG. 10. The I/O device table creation unit 205 of the BMC 20 uses each of the PCIe and I2C routes in the server 1 with the configuration illustrated in FIG. 15, for example. The I/O device table creation unit 205 then acquires the hardware information of the I/O device 13 using the MCTP protocol (P71, P72). The processing at P71 is an example of the BMC 20 as a management device acquiring information identifying an electrical device whose initialization has been completed via the first transmission route. Furthermore, the processing at P72 is an example of a management device acquiring information identifying an electrical device to which at least the power has been applied via the first transmission route. It is to be noted that the processing from S1 to S3B in FIG. 5 that is performed as a precondition of the above-described pieces of processing is an example of activating a processing device. Furthermore, the processing from P4 to P6 in FIG. 10 that is performed as a precondition of the processing at P71 and P72 is an example of causing a processor to initialize an electrical device via the first transmission route.

The I/O device table creation unit 205 compares pieces of information that have been acquired using two routes of the PCIe and I2C to check coincidence therebetween (P73). The I/O device table creation unit 205 then determines whether there is any abnormal route from which information is not be able to be acquired (P74). When there is any abnormal route from which information is not be able to be acquired, the I/O device table creation unit 205 points out an error in the route in which an abnormality has occurred (P75). For example, the BMC 20 outputs information of the route in which an abnormality has occurred and the contents of the error on a screen for providing to a PC via a web server program. Furthermore, for example, the BMC 20 outputs an error message including information identifying the slot number of the PCIe on a website on the PC. At this point, when abnormalities have occurred in both of the routes, the I/O device table creation unit 205 may determine that an abnormality has occurred in the I/O device 13.

When there is no route in which an error has occurred at P74, the I/O device table creation unit 205 determines whether the pieces of information acquired from the two routes are both normal (P76). A case where they are not normal includes a case where the slot number of the PCIe is not within a range identified from the number of slots in the server 1, a case where the vendor name does not coincide with any in vendor information that is present, and a case where the device ID does not coincide with any in device ID group. Furthermore, when at least one of the pieces of information acquired from the two routes is not normal, the I/O device table creation unit 205 points out an error pointing out the I/O device 13 having an abnormality. For example, the BMC 20 outputs information of the device in which the abnormality has occurred and the contents of the error on a screen for providing to a PC via a web server program (P77). By contrast, when the pieces of information are both normal by the determination at P76, the I/O device table creation unit 205 ends the processing.

FIG. 17 illustrates information of the I/O device 13 that is acquired by the I/O device table creation unit 205. The table on the upper side in FIG. 17 is an example of information acquired from the PCIe route by the I/O device table creation unit 205 using the MCTP protocol. Furthermore, the table on the lower side in FIG. 17 is an example of information acquired from the I2C route by the I/O device table creation unit 205 using the MCTP protocol.

As illustrated in FIG. 17, the acquired information includes a vendor ID, a device ID, and a serial number for each slot number. Furthermore, in the example in FIG. 17, out of pieces of information acquired from the PCIe route, an error occurs in acquiring information corresponding to the slot number 1, for which the vendor ID, the device ID, and the serial number have not been acquired. By contrast, from the I2C route, all pieces of information of the slot have been acquired. Accordingly, in such a case as illustrated in FIG. 17, the I/O device table creation unit 205 acknowledges the error with the slot number 1 of the PCIe, and based on the information acquired from the I2C route, the vendor ID, the device ID, and the serial number of the I/O device 13 attached to the slot number 1 of the PCIe are able to be identified.

As described above, in a case where acquisition of the hardware information has been a failure, when an error has occurred in one of the two routes, the BMC 20 is able to point out an abnormality in the route in which the error has occurred. Furthermore, in a case where errors have occurred in both of the routes, the BMC 20 is able to point out an abnormality of the I/O device 13 itself. In the processing at P75 in FIG. 16, for example, an error has detected in the PCIe route for the slot #1, and the BMC 20 thus points out an error with respect to an abnormality of the PCIe route for the slot #1.

The BMC 20 does not demand any special limitation with respect to the type of the route as long as the MCTP protocol is able to be performed. Furthermore, when an error has occurred in a plurality of routes, the BMC 20 is able to identify that there is an error in the I/O device 13. Furthermore, the route of SMBus/I2C is able to be connected one-to-one to the I/O device 13, and the BMC 20 thus does not stop processing at an error in one of the I/O devices 13 and is able to check errors in a plurality of the I/O devices 13. After acquisition of information of all of the I/O devices 13 using the MCTP has been completed, the BMC 20 changes the activation mode to the "normal" as in the processing at P8 in the flowchart in FIG. 10 and then turn off the power of the server 1. Accordingly, when an error is pointed out by the BMC 20, in this power-off state, replacement of the part having the error is possible. However, after the AC power is applied to the server 1, the BIOS may disable the I/O device 13 in which occurrence of an error has been pointed out.

The description below is processing performed when the manager of the BMC 20 or the server 1 turns on the power of the server 1. With the processing described above, when an error occurs continuously as in a permanent fault, the BIOS points out an error of the I/O device 13 and disables all of the I/O devices 13 in which an error has occurred, and the server 1 is activated.

<Processing when an Error has Occurred>

Figure 18:
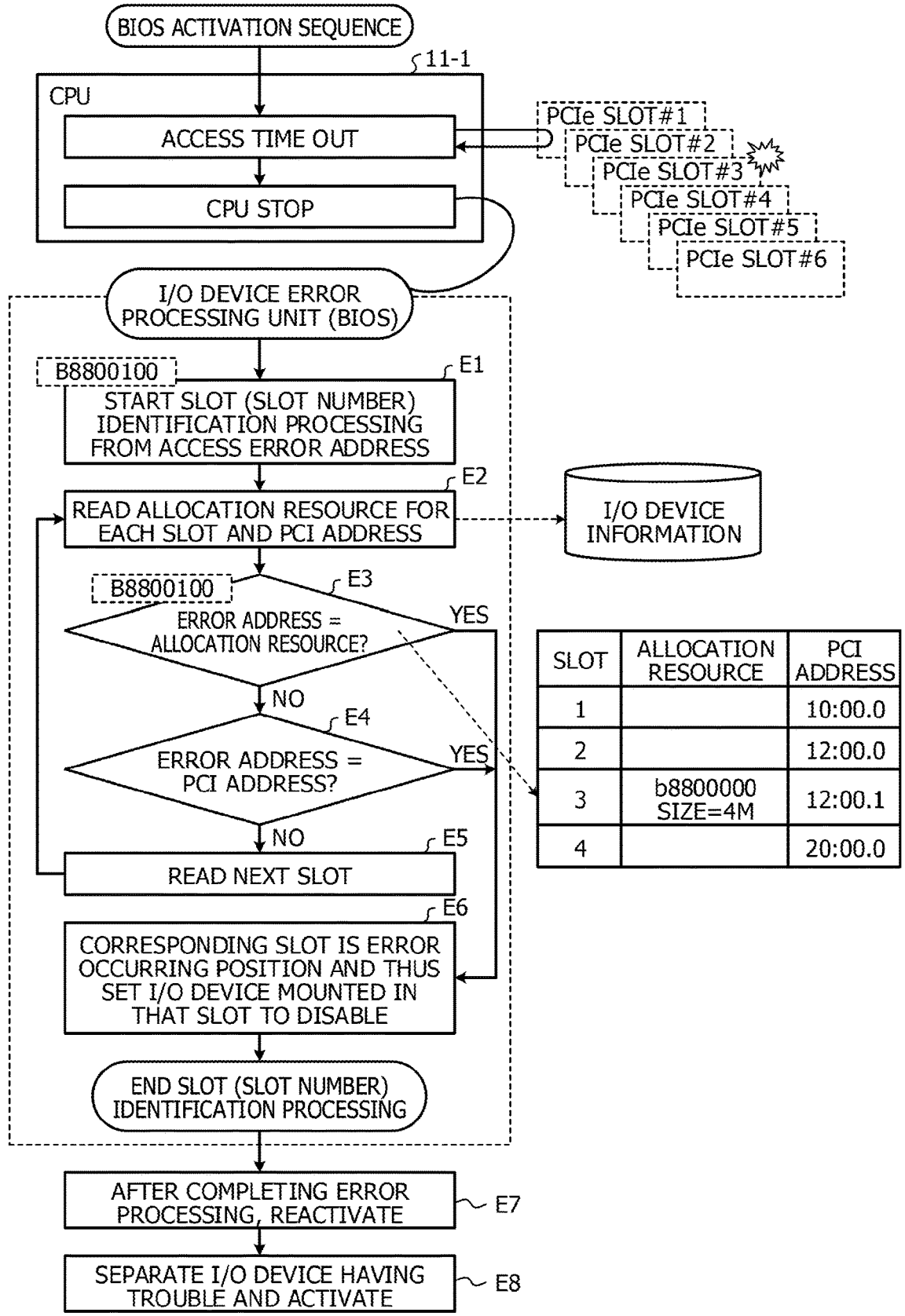
FIG. 18 is a diagram illustrating processing of an I/O device error processing unit.

FIG. 18 illustrates processing of the I/O device error processing unit 107 when an error has occurred in the I/O device 13 in an activation sequence by the BIOS in the "normal mode". In FIG. 18, a case is assumed where, in one CPU 11, an access timeout has occurred during initialization of the I/O device 13 and the CPU 11 has been stopped. It is assumed that the I/O device 13 is now accessed as an address of the address space in a main memory. In this case, due to the access timeout, an error handler being a calling routine when an error has occurred is activated in the CPU 11. The CPU 11 performs a program of the error handler as the I/O device error processing unit 107. It is to be noted that, in FIG. 18, although the error handler is activated due to the access timeout, the error handler is activated by a cause other than the access timeout. For example, a case where a return value from the I/O device 13 indicates an access error may be cited. In any case, the address (hereinafter, an access error address) of the address space in the memory 12 for accessing the I/O device 13 accessed by the CPU 11 is forwarded to the I/O device error processing unit 107.

The I/O device error processing unit 107 identifies the I/O device 13 (slot number) from the access error address notified from the CPU 11 (E1). The I/O device error processing unit 107 acquires the I/O device information from the BMC 20 (E2) and, based on the allocation resource for each slot and the PCI address, checks whether the error address is corresponded. That is to say, the I/O device error processing unit 107 determines whether the access error address is within the range of the allocation resource (E3). The range of the allocation resource is determined by the head address and the size (capacity of the area) of the memory 12 as the allocation resource in the I/O device information which has already been illustrated in FIG. 13.

When the access error address is not within the allocation resource (NO at E3), the I/O device error processing unit 107 determines whether the access error address coincides with the PCI address. As has already been described, the PCI address is an address in the PCI configuration space allocated to the I/O device 13. In the example in FIG. 18, as a precondition, the PCI configuration space is mapped to the address space in the memory 12. The I/O device error processing unit 107 then determines whether the access error address coincides with the PCI address mapped to the address space in the memory 12 (E4). In the example in FIG. 18, in the case of NO at E4, the I/O device error processing unit 107 sequentially reads out information of each slot stored in the I/O device information (E5) and sequentially searches for the allocation resource of each slot or a slot whose PCI address mapped to the address space in the memory 12 corresponds with the access error address.

Thereafter, by the determination at E3, when the access error address with which the error has occurred is included in the range of the allocation resource of any slot or corresponds with the PCI address of a slot mapped to the address space in the memory 12, the slot in which the error has occurred is identified (E6). The I/O device error processing unit 107 then sets the I/O device 13 mounted in the slot in which the error has occurred to "Disable" in the device disable setting management table.

In the example in FIG. 18, the access error address B8800100 corresponds to the allocation resource of the slot #3, and thus the slot #3 has an error. The I/O device error processing unit 107 disables the I/O device in the slot #3 having the error, and thus disables the slot #3 in the device disable setting management table. Furthermore, the I/O device error processing unit 107 completes the processing and reactivates the server 1 is (E7). When the next server 1 is reactivated, the BIOS disables the I/O device in the slot #3 using the device disable setting management table and normally activates the server 1 without an error (E8). Furthermore, by enabling a notification function of disablement of the I/O device 13 with a setting of the BIOS, the I/O device 13 is able to be disabled, so that a check message is displayed on an activation screen of the server 1 at the time of the activation. The processing from E2 to E8 is an example of a processor identifying an electrical device in which an error has occurred based on information of the electrical device acquired when the error has occurred during initialization of the electrical device. Furthermore, the processing at S5A and S5B in FIG. 6 which is performed as a precondition of the processing in FIG. 18 is an example of reactivation of a processing device. Furthermore, the processing at 58A in FIG. 7 is an example of a processor acquiring the collected information identifying the electrical device from the management device.

FIG. 19 is a configuration example of the device disable setting management table. The device disable setting management table is a table associating the slot numbers and device disable setting values. To entries corresponding to the slot numbers in the device disable setting management table, "Enable" or "Disable" is set.

Effect of Embodiment

As described above, according to the server 1 in the present embodiment, the BMC 20 acquires the information of the I/O device 13 as an electrical device with a configuration and procedures compliant with the MCTP via the transmission route of the I2C as the second transmission route by the I2C being the second interface. Furthermore, the BMC 20 is able to communicate with the CPU 11 using the KCS interface 25 as a third transmission route to activate the server 1. Accordingly, when the power is applied to the I/O device 13 and the I/O device 13 is under operation, the BMC 20 is able to acquire the information of the I/O device 13 from the transmission route of the I2C as the second transmission route by the I2C being the second interface. The BMC 20 then is able to provide the acquired information of the I/O device 13 to the BIOS executed in the CPU 11 via the third transmission route using the KCS being a third interface. Accordingly, during the activation of the server 1, even when an error has occurred in the I/O device 13 in a state in which the BIOS is not able to identify the I/O device 13, the BIOS is able to acquire the information identifying the I/O device 13 in which the error has occurred from the BMC 20.

Furthermore, in the present embodiment, when the I/O device 13 has been initialized, the BMC 20 is able to acquire the information of the I/O device 13 as an electrical device with a configuration and procedures compliant with the MCTP via two transmission routes exemplified by the PCIe and I2C. That is to say, the BMC 20 is able to acquire the information of the I/O device 13 with a configuration and procedures compliant with the MCTP via the PCIe as the first transmission route in addition to the I2C as the second transmission route (a third effect). That is to say, when the power is applied to the I/O device 13, even when initialization in accordance with the PCIe has not been performed, the BMC 20 is able to acquire information from the I/O device 13 via the I2C as the second transmission route. Furthermore, when the I/O device 13 has been initialized via the PCIe as the first transmission route, the BMC 20 is able to acquire information from the I/O device 13 via the PCIe. Accordingly, even when an error has occurred in one of the first transmission route and the second transmission route while the BMC 20 acquires the information from the I/O device 13, the BMC 20 is able to acquire the information of the I/O device 13 from the transmission route in which the error has not occurred.

Furthermore, when errors have occurred in both of the first transmission route and the second transmission route during acquisition of the information from the I/O device 13, the BMC 20 may determine that an abnormality has occurred in the I/O device 13 itself.

Furthermore, when the BMC 20 activates the server 1 to acquire the information from the I/O device 13, the BMC 20 and the I/O device 13 may activate the server 1 with a minimum configuration enabling communication between the BMC 20 and the I/O device 13 using the MCTP. That is to say, when the BMC 20 acquires the information from the I/O device 13, the server 1 is initialized and activated with a hardware configuration with resources less than normal, and thus activated in a shorter time than normal.

Furthermore, when the BMC 20 acquires the information from the I/O device 13, the BMC 20 and the I/O device 13 communicate with each other with procedures compliant with the MCTP. Accordingly, the BMC 20 is able to collect the information of the I/O device 13 with the load of the processing in the CPU 11 suppressed.

Furthermore, in the present embodiment, when errors occur in a plurality of I/O devices 13, the BIOS points out the plurality of errors without stopping at an error in one of the I/O devices 13, enabling to collectively perform operations for replacing the I/O device 13 that has a trouble.

<Computer-Readable Storage Medium>

A program for a computer or other machine or device (hereinafter, referred to as a computer or the like) to implement any of the above-described functions may be stored in a computer-readable storage medium. Then, by causing the computer or the like to read the program in this storage medium and execute the program, the functions may be provided.

At this point, a computer-readable storage medium means a storage medium that is able to accumulate therein information such as data or a program using an electrical, magnetic, optical, mechanical, or chemical action and be read from a computer or the like. Out of storage media as described above, ones being removable from a computer or the like include a flexible disk, a magneto-optical disk, a CD-ROM, a CD-R/W, a DVD, a Blue-ray disk, a DAT, a 8-mm tape, and a memory card such as a flash memory, for example. Furthermore, storage media fixed to a computer or the like include a hard disk and a read-only memory (ROM). Furthermore, a solid state drive (SSD) is able to be used as a storage medium removable from a computer or the like as well as a storage medium fixed to a computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a device;
   a management device that is connected to the device via a first transmission route and configured to acquire information regarding the device via the first transmission route; and
   a processing device that is connected to the device via a second transmission route, connected to the management device via a third transmission route, and configured to initialize the device and acquire the information from the management device via the third transmission route, the management device is configured to acquire the information regarding the device via the second transmission route without passing through the processing device,
   the management device is further configured to control the processing device to activate, in a first activation of the processing device, the processing device in a minimum activation mode in which first resources less than second resources which are initialized in a normal activation mode are initialized and activate, in a reactivation of the processing device, the processing device in the normal activation mode in which the second resources are initialized based on the acquired information regarding the device by the management device via the second transmission route.

2. The information processing device according to claim 1, wherein the management device is a baseboard management controller, the processing device has a processor configured to perform BIOS, the device is an input/output device, the first transmission route is an Inter-Integrated Circuit type of wire, and the second transmission route is a Peripheral Component Interconnect-Express type of wire.

3. The information processing device according to claim 1, wherein the processing device is further configured to, when an error has occurred during initialization of the device, identify the device that has the error on the basis of the acquired information.

4. The information processing device according to claim 1, wherein the management device is connected to the device via the second transmission route.

5. The information processing device according to claim 4, wherein the management device is further configured to, when the information is not acquired via either the first transmission route or the second transmission route, output error information related to the device.

6. The information processing device according to claim 1, wherein the management device is connected to the device via the second transmission route and configured to communicate with the device via the second transmission route without passing through the processing device.

7. An information processing method comprising:
   acquiring information regarding a device via a first transmission route by a management device that is connected to the device via the first transmission route;
   initializing the device by a processing device that is connected to the device via a second transmission route and connected to the management device via a third transmission route;
   acquiring the information from the management device via the third transmission route by the processing device, the management device is configured to acquire the information regarding the device via the second transmission route without passing through the processing device; and
   controlling, by the management device, the processing device to activate, in a first activation of the processing device, the processing device in a minimum activation mode in which first resources less than second resources which are initialized in a normal activation mode are initialized and activate, in a reactivation of the processing device, the processing device in the normal activation mode in which the second resources are initialized based on the acquired information regarding the device by the management device via the second transmission route.

8. The information processing method according to claim 7, wherein the management device is a baseboard management controller, the processing device has a processor configured to perform BIOS, the device is an input/output device, the first transmission route is an Inter-Integrated Circuit type of wire, and the second transmission route is a Peripheral Component Interconnect-Express type of wire.

9. The information processing method according to claim 7, further comprising:
   when an error has occurred during initialization of the device, identifying, by the processing device, the device that has the error on the basis of the acquired information.

10. The information processing method according to claim 7, wherein the management device is connected to other device via the first transmission route and via the second transmission route, the management device is configured to acquire other information regarding the other device via either the first transmission route or the second transmission route.

11. The information processing method according to claim 10, further comprising: when the other information is not acquired by the management device, outputting, by the management device, error information regarding the other device.

12. The information processing method according to claim 7, wherein the management device is connected to the device via the second transmission route and configured to communicate with the device via the second transmission route without passing through the processing device.

13. A non-transitory computer-readable medium storing instructions executable by a computer that includes a device, a management device that is connected to the device via a first transmission route, and a processing device that is connected to the device via a second transmission route, and connected to the management device via a third transmission route, the instructions comprising:

instructions for acquiring information regarding the device via the first transmission route by the management device, the management device is configured to acquire the information regarding the device via the second transmission route without passing through the processing device;

instructions for initializing the device by the processing device;

instructions for acquiring the information from the management device via the third transmission route by the processing device; and instructions for controlling, by the management device, the processing device to activate, in a first activation of the processing device, the processing device in a minimum activation mode in which first resources less than second resources which are initialized in a normal activation mode are initialized and activate, in a reactivation of the processing device, the processing device in the normal activation mode in which the second resources are initialized based on the acquired information regarding the device by the management device via the second transmission route.

* * * * *